(12) United States Patent
Chong et al.

(10) Patent No.: US 11,977,496 B1
(45) Date of Patent: May 7, 2024

(54) SECURITY VULNERABILITY MITIGATION USING HARDWARE-SUPPORTED CONTEXT-DEPENDENT ADDRESS SPACE HIDING

(71) Applicant: Amazon Technologies, Inc., Seattle, WA (US)

(72) Inventors: Nathan Yong Seng Chong, Ponte Vedra, FL (US); Karimallah Ahmed Mohammed Raslan, Leander, TX (US)

(73) Assignee: Amazon Technologies, Inc., Seattle, WA (US)

( * ) Notice: Subject to any disclaimer, the term of this patent is extended or adjusted under 35 U.S.C. 154(b) by 41 days.

(21) Appl. No.: 17/936,783

(22) Filed: Sep. 29, 2022

(51) Int. Cl.
*G06F 12/14* (2006.01)
*G06F 21/57* (2013.01)

(52) U.S. Cl.
CPC .......... *G06F 12/1491* (2013.01); *G06F 21/57* (2013.01)

(58) Field of Classification Search
CPC .............................. G06F 12/1491; G06F 21/57
See application file for complete search history.

(56) References Cited

U.S. PATENT DOCUMENTS

| | | | |
|---|---|---|---|
| 6,658,447 B2 | 12/2003 | Cota-Robles | |
| 7,493,436 B2 | 2/2009 | Blackmore et al. | |
| 7,698,707 B2 | 4/2010 | Accapadi et al. | |
| 7,992,156 B1 | 8/2011 | Wang | |
| 8,136,111 B2 | 3/2012 | Mall et al. | |
| 8,145,797 B2 | 3/2012 | Floyd | |
| 9,286,105 B1 * | 3/2016 | Levchenko | ......... G06F 9/45558 |
| 9,785,557 B1 | 10/2017 | Frey | |
| 11,593,169 B2 * | 2/2023 | Chisnall | .................. G06F 9/355 |
| 2003/0033510 A1 | 2/2003 | Dice | |
| 2004/0215932 A1 | 10/2004 | Burky | |

(Continued)

OTHER PUBLICATIONS

U.S. Appl. No. 18/457,224, filed Aug. 28, 2023, Amith Shah, et al.

(Continued)

*Primary Examiner* — Baboucarr Faal
(74) *Attorney, Agent, or Firm* — Robert C. Kowert; Kowert, Hood, Munyon, Rankin & Goetzel, P.C.

(57) ABSTRACT

A system, method and processor that mitigates security vulnerabilities using context-dependent address space hiding. In some embodiments, a hardware mechanism allows a more-privileged software component managing multiple less-privileged software components to blind itself against "out-of-context" less-privileged software components. The hardware mechanism can allow the more-privileged software component to dynamically hide a portion of the more-privileged address space related to the "out-of-context" less-privileged software components, based on knowledge of the "in-context" less-privileged software component. A context register is set with a value from which an address range, within the address space of the more-privileged software component, can be determined, where the address range is associated with a first less-privileged software component can be determined. When the more-privileged software component attempts to access data from other less-privileged software components, it is prevented from accessing such data, based at least in part on the context register.

20 Claims, 12 Drawing Sheets

(56) References Cited

U.S. PATENT DOCUMENTS

| | | |
|---|---|---|
| 2004/0268325 A1 | 12/2004 | Moore |
| 2005/0015702 A1 | 1/2005 | Shier |
| 2006/0041735 A1 | 2/2006 | Hepkin |
| 2008/0133842 A1 | 6/2008 | Raikin |
| 2008/0184240 A1 | 7/2008 | Franaszek |
| 2008/0313417 A1 | 12/2008 | Kim |
| 2010/0082867 A1 | 4/2010 | Adachi |
| 2011/0296421 A1 | 12/2011 | Gschwind |
| 2012/0222035 A1 | 8/2012 | Plondke |
| 2014/0026138 A1 | 1/2014 | Itou |
| 2014/0259117 A1 | 9/2014 | Wachendorf |
| 2015/0013008 A1 | 1/2015 | Lukacs |
| 2015/0022538 A1 | 1/2015 | Munshi |
| 2015/0178219 A1 | 6/2015 | Aslot |
| 2016/0224509 A1 | 8/2016 | Moudgill |
| 2016/0267000 A1 | 9/2016 | Rose |
| 2016/0283237 A1 | 9/2016 | Pardo |
| 2016/0371123 A1 | 12/2016 | Zhang |
| 2017/0109189 A1 | 4/2017 | Swidowski |
| 2017/0212811 A1 | 7/2017 | Kashnikov |
| 2018/0011711 A1 | 1/2018 | Ray |
| 2018/0137136 A1 | 5/2018 | Altaparmakov |
| 2018/0285106 A1 | 10/2018 | Appu |
| 2018/0287949 A1 | 10/2018 | Kumar |
| 2019/0138720 A1 | 5/2019 | Grewal |
| 2019/0196982 A1 | 6/2019 | Rozas |
| 2020/0133873 A1 | 4/2020 | Williams |
| 2020/0150960 A1 | 5/2020 | Williams |
| 2020/0174931 A1 | 6/2020 | Williams |
| 2020/0183696 A1 | 6/2020 | Williams |
| 2020/0183843 A1 | 6/2020 | Williams |
| 2020/0201780 A1 | 6/2020 | Williams |
| 2020/0201786 A1 | 6/2020 | Ouziel |
| 2020/0301735 A1 | 9/2020 | Accapadi |
| 2020/0327367 A1 | 10/2020 | Ma |
| 2020/0356409 A1 | 11/2020 | Williams |
| 2020/0364375 A1 | 11/2020 | Bottomley |
| 2020/0409771 A1 | 12/2020 | Williams |
| 2023/0205562 A1* | 6/2023 | Basak ............... G06F 13/4221 718/1 |

OTHER PUBLICATIONS

Changhee Jung, et al., Adaptive execution techniques for SMT multiprocessor architectures:, PPoPP'05, ACM, Jun. 15-17, 2005, pp. 236-246.

Nael Abu-Ghazaleh, et al., "How the Spectre and Meltdown Hacks Really Worked", Retrieved from https://spectrum.ieee.org/computing/hardware/how-the-spectre-and-meltdown-hacks-really-worked on Jun. 3, 2019, pp. 1-18.

Microsoft Tech Community, Hyper-V HyperClear Mitigation for L1 Terminal Fault, Retrieved from https://techcommunity.microsoft.com/t5/Virtualization/Hyper-V-HyperClear-Mitigation-for-L1-Terminal-Fault/ba-p/382429 on Jun. 21, 2019, pp. 1-11.

Deborah T. Marr, et al., "Hyper-Threading Technology Architecture and Microarchitecture", Intel Technology Journal Q1, 2002, pp. 1-12.

Alexander Chartre, KVM Address Space Isolation, Retrieved from https://lwn.net/Articles/788273/ on Jun. 21, 2019, pp. 1-6.

Andy Greenberg, "Meltdown Redux: Intel Flaw Lets Siphon Secrets From Millions of PCs", Retrieved from https://www.wired.com/story/intel-mds-attack-speculative-execution-buffer/ on Jun. 3, 2019, pp. 1-20.

Microsoft, "Protect your Windows devices against speculative execution side-channel attacks", Retrieved from https://support.microsoft.com/en-us/help/4073757/protect-windows-devices-from-speculative-execution-side-channel-attack on Jun. 5, 2019, pp. 1-10.

Jochen Liedtke, et al., "Lazy Process Switching", Proceedings Eighth Workshop on Hot Topics in Operating Systems, IEEE, 2001, pp. 13-16.

Alexandre Chartre, "LKML: Kernel Address Space Isolation", Retrieved from https://lkml.org/lkml/2019/7/11/351 on Jul. 20, 2019, pp. 1-5.

Unknown, "Cache speulation Side-Channels", Whitepaper, Retrieved from https://developer.arm.com/documentation/102816/0205/, dated Jun. 2020, version 2.5, pp. 1-21.

U.S. Appl. No. 16/552,772, filed Aug. 27, 2019, Amit Shah.

* cited by examiner

US 11,977,496 B1

SECURITY VULNERABILITY MITIGATION USING HARDWARE-SUPPORTED CONTEXT-DEPENDENT ADDRESS SPACE HIDING

BACKGROUND

Many modern computer applications require substantial amounts of computation capacity. Many types of multi-processor or parallelized computer system architectures have been designed to enable numerous portions of a given application, or portions of different applications, to be executed concurrently at a given computing device. The advent of virtualization technologies has provided benefits with respect to managing large-scale computing resources for many customers with diverse needs, allowing various computing resources to be efficiently and securely shared by multiple customers. For example, virtualization technologies may allow a single physical computing machine to be shared among multiple users at a computing service by providing each user with one or more compute instances (e.g., guest virtual machines) hosted by the single physical computing machine. Each such compute instance may be regarded as a software simulation acting as a distinct logical computing system. Virtualization management software such as a hypervisor may be employed as an intermediary between physical hardware components (including SMT processors) and the virtualized representations of the hardware provided to the compute instances.

In many computing systems (e.g., phones, desktops and server-class) less-privileged software components are managed by more-privileged software components. For example, (1) applications are managed by operating systems and/or (2) virtual machines (i.e., guest operating systems) are managed by hypervisors. By design, more-privileged software components have more permissions than less-privileged software. For example, an application is given a virtual address space managed by an operating system and a virtual machine is given a guest physical address space managed by a hypervisor. This is necessary to enable the required functionality needed by the more-privileged software component for features such as resource allocation, scheduling and other management capabilities. However, this also means that the more-privileged software component has the capability (i.e., read/write access) to the resources given to the less-privileged software component. For example, an operating system can read or write to the physical memory allocated to an application.

Figure 1:
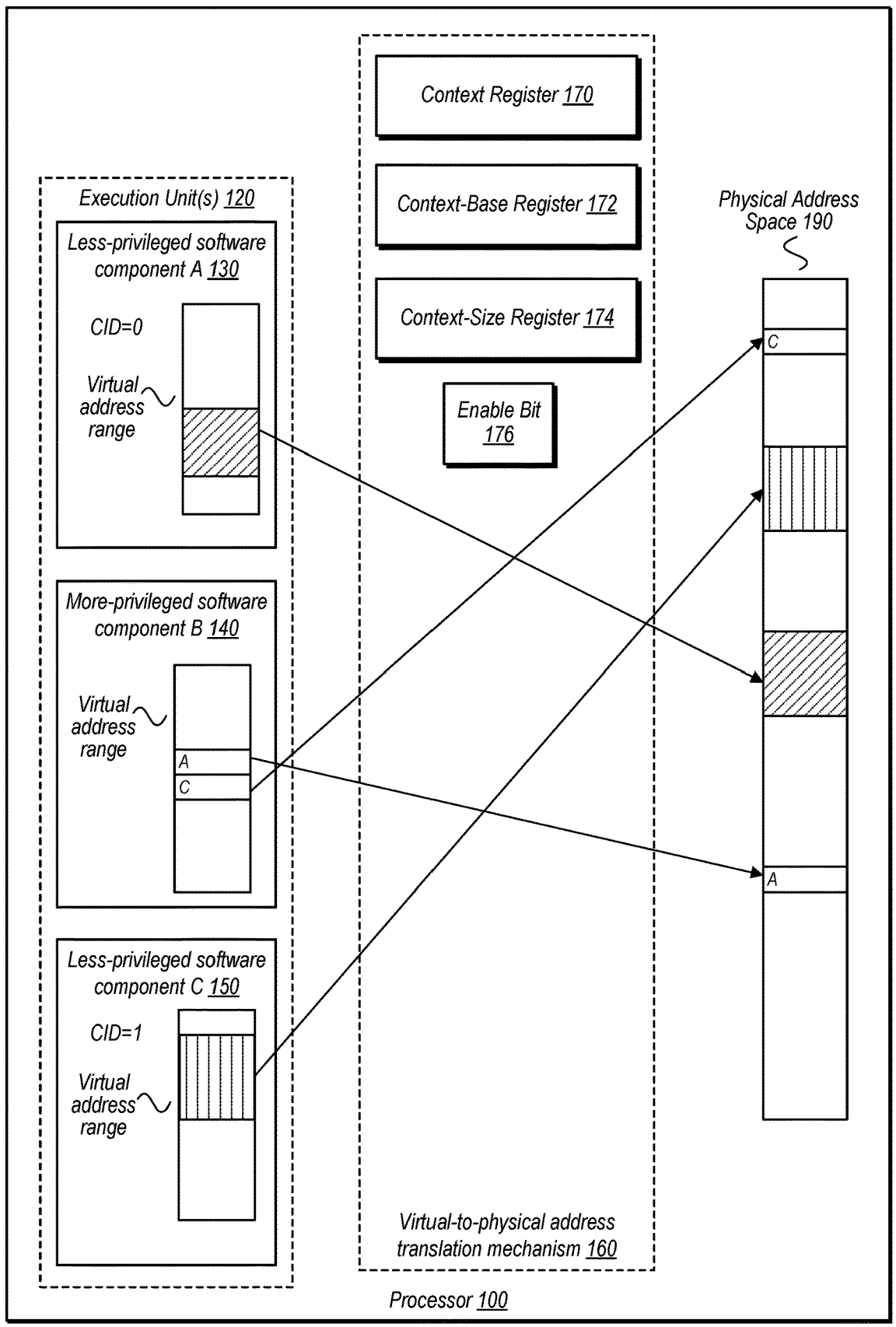
FIG. 1 illustrates an example processor, that supports more and less-privileged software components, in which hardware supported context-dependent address space hiding may be used to mitigate security vulnerabilities, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for using an address space transition management technique, referred to herein as hardware support for context-dependent address space hiding, to mitigate potential security vulnerabilities at computing devices equipped with processors that implement more-privileged software components and less-privileged hardware components. More specifically, some embodiments of the present disclosure relate to a performant, space-efficient hardware-software mechanism that allows a more-privileged software component, managing multiple less-privileged software components, to blind itself against "out-of-context" less-privileged software components as an additional protection against misprogramming and security issues. The hardware-software mechanism can dynamically hide a portion of the more-privileged address space from the more-privileged software component based on knowledge of the "in-context" less-privileged software component.

In a system with multiple applications (or virtual machines) running under an operating system (or hypervisor), each application (or virtual machine) is assigned an identifier. These identifiers are known as an address space identifier ("ASID") or virtual machine identifier ("VMID"). The present disclosure will call them a Context identifier ("CID") to refer to either kind of identifier, as well as other related kinds of identifiers. In some embodiments, the more-privileged software component must run as a result of a less privileged component. For example, a more-privileged software component might run as a result of scheduling (i.e., a timer interrupt), or it might run as a result of a system call (i.e., a Supervisor Call instruction ("SVC") or a Hypervisor Call ("HVC") instruction). This application will refer to the requesting less-privileged software component as the "in-context" CID. Note that in most embodiments there is exactly one "in-context" CID. In addition, this application will refer to the resident, but not "in-context", less-privileged software components as the "out-of-context" CIDs. There can be 1 to many of these "out-of-context" CIDs.

In some embodiments, under these kinds of conditions, the more-privileged software component should not need access to resources allocated to any "out-of-context" software components. However, due to its elevated privileged, it normally would have access. This access can result in security vulnerabilities. For example, the more-privileged software component is susceptible to speculation attacks during system calls (which result in less-privileged to more-privileged mode switches) given that all metadata for all components live in the same (more-privileged) address space.

In recent years, a number of vulnerabilities associated with the capture or access of data of one instruction stream by another instruction stream running on the same processor have been identified, using techniques such as micro-architectural data sampling ("MDS"), "L1TF" (level-1 cache terminal fault), and the like. L1TF, for example, is a speculative execution attack on Intel processors that may result in the disclosure of sensitive information stored in personal computers and third-party clouds. Such techniques are sometimes referred to as "side-channel" attacks. Some of the vulnerabilities are in a sense "built-in" in to the processor hardware architecture (e.g., in the architecture of superscalar processors at which speculative execution and other advanced techniques are used to improve performance), and as a result are not easy to mitigate or resolve in software without significant performance reduction.

As another example, another security vulnerability can be cache timing side-channels attacks exploiting processor speculation for Arm implementations. The basic principle behind cache timing side-channels attacks is that a pattern of allocations into the cache, and, in particular, which cache sets have been used for the allocation, can be determined by measuring the time taken to access entries that were previously in the cache, or by measuring the time to access the entries that have been allocated. This then can be used to determine which addresses have been allocated into the cache.

Further to this example, speculation-based cache timing side-channel attacks use speculative memory reads as part of the attacks. Speculative memory reads are typical of advanced micro-processors and part of the overall functionality which enables very high performance. By performing speculative memory reads to cacheable locations beyond an architecturally unresolved branch (or other change in program flow), the result of those reads can themselves be used to form the addresses of further speculative memory reads. These speculative reads can cause allocations of entries into the cache whose addresses are indicative of the values of the first speculative read. This becomes an exploitable side-channel if untrusted code is able to control the speculation in such a way it causes a first speculative read of location which would not otherwise be accessible at that untrusted code. But the effects of the second speculative allocation within the caches can be measured by that untrusted code.

There can be at least four variant mechanisms of speculation-based cache timing side-channel attacks. Each mechanism potentially uses the speculation of a processor to influence which cache entries have been allocated in a way to extract some information which would not otherwise be accessible to software. The at least four mechanisms are: (1) bypassing software checking of untrusted values; (2) forcing privileged speculation by training branch predictors; (3) using speculative reads of inaccessible data; and (4) speculative bypassing of stores by younger loads despite the presence of a dependency.

There are many other kinds of security vulnerabilies that can arise when a more-privileged software component is able to access resources allocated to any "out-of-context" software components. Because of these security vulnerabilities, including the security vulnerabilities described above as well as other ones not described, security vulnerability mitigation techniques are needed. Therefore, it is advantageous from a security point of view for a more-privileged software component to relinquish its capability based upon the currently "in-context" CID, since less-privileged software components should be isolated from one-another.

In some embodiments, a solution to these security vulnerabilities can be for the more-privileged software component to reprogram its own view of memory (through page table management) to hide (or make inaccessible) resources allocated to out-of-context CIDs. This is feasible, but can incur a significant performance overhead. Reprogramming translation tables requires multiple loads/stores and synchronization. The performance overhead can limit its practical applicability. What is needed, instead, is the ability to get the security advantages of isolating out-of-context memory with a low-performance overhead.

In other embodiments, as an alternative solution, a more-privileged software component can maintain (for itself) multiple copies of its page tables and/or translation tables.

The more-privileged software component can switch these tables dependent on the "in-context" CID, based on the calling less-privileged software component. This technique is higher performance than the previous solution during the switch, but requires more space because of the multiple page tables and/or translation tables that need to be defined. In addition, this technique requires performance overhead in maintaining the multiple copies of the page tables and/or translation tables.

The hardware-supported context-dependent address space hiding, of some other embodiments, is both performant with low space requirements. In these embodiments, a hardware-software mechanism can dynamically hide a portion of the more-privileged address space based on knowledge of the "in-context" CID. More specifically on the hardware-side, these embodiments employ a software-managed "context-register." In some of these embodiments, this context-register can also include an enable field under the control of the more-privileged software component. In other embodiments, an enable bit might be part of another register, or might comprise its own register, or might comprise a memory location. In some embodiments, the enable bit might not be a "bit", but might be an entire register or memory location. In other embodiments, there might not be a specific enable register or memory location, but the enable mechanism might be knowledge of whether the current context is the more-privileged software component or the less-privileged software component. There might be other mechanisms that allow the determination of whether to apply a memory access security mechanism.

On the software-side, the hardware-supported context-dependent address space hiding embodiments can have requirements about how the more-privileged software component maps less-privileged software components into its own address map. The mapping can be designed, in these embodiments, so that it is straightforward to disable mappings for "out-of-context" CIDs. In some embodiments, "out-of-context" CIDs can be all CIDs that do not match the value of the "context-register." For example, if the CID is a 16-bit unsigned integer, the memory allocated to each CID can be mapped at some fixed, or configurable, page multiple of the more-privileged virtual address space, depending on the embodiment. In the embodiments of the fixed case, the hardware can provides a "context-base" register, which holds the address of the $0^{th}$ (zero-th) CID. In the embodiments of the configurable page case, the hardware additionally provides a "context-size" register which defines the number of translation granules reserved per CID.

To work, the more-privileged software component can program the context-register with the identifier of the requesting less-privileged software component, in these embodiments. The identifier of the requesting less-privileged software component can also be known as the "in-context" CID. Hardware (i.e., the MMU) can use the context-register to override the more-privileged software component's virtual-to-physical translation, and force a translation fault if the more-privileged software component erroneously attempts to access "out-of-context" memory, in these embodiments. In the setting of these embodiments, the more-privileged software component has therefore blinded itself to "out-of-context" data. Because the underlying translation (defined in memory) does not change and instead relies on hardware-support, the performance impact of these embodiments is negligible compared to reprogramming the translation. In some of these embodiments, changes to translation caching structures (i.e., translation lookaside buffers ("TLBs")) might also be required. In particular, the lookup for a translation match must factor in the context-register in these embodiments.

These hardware-supported context-dependent address space hiding embodiments can operate for at least 3 types of data. (1) Data owned wholly by the less-privileged software component. (2) Data owned wholly by the more-privileged software component that is used for the purpose of managing (i.e., metadata about) the less-privileged software component. (3) Data shared between the more-privileged software component and the less-privileged software component. Of these three types of data, the second type is the most natural type to fit into these embodiments, since the metadata per less-privileged software component is small (on the order of a few pages). However, nothing in this disclosure precludes the ability of these embodiments to blind other types of data, including data of types (1) and (3).

As one skilled in the art will appreciate in light of this disclosure, certain hardware-supported context-dependent address space hiding embodiments may be capable of achieving various advantages and practical applications/benefits, including some or all of the following: (a) significantly reducing the probability of data leaks which may otherwise be possible due to inherent vulnerabilities of at least some hardware processor architectures, (b) improving the utilization levels and performance levels achieved at servers that employ processors with the hardware-supported context-dependent address space hiding functionality, relative to the utilization levels and performance levels that may have been obtained if other software techniques (such as reprogramming page and/or translation tables) to mitigate the hardware vulnerabilities were employed, and/or (c) enhancing the security of applications run on multi-tenant virtualization hosts of virtualized computing services implemented at provider networks or cloud computing environments.

Hardware-supported context-dependent address space hiding techniques of the kind introduced above may be employed at various types of computing devices. In some embodiments, for example, the "out-of-context" CIDs to hide may be identified by a task scheduler of an operating system running at a non-virtualized host. In other embodiments, the "out-of-context" CIDs to hide may be identified by a task scheduler of hypervisor running at a virtualization host. Such a virtualization host may also be used to run a number of compute instances (e.g., guest virtual machines), each of which may in turn comprise a respective operating system instance as well as one or more application programs. In some embodiments, hardware-supported context-dependent address space hiding may be implemented at multiple levels at a virtualization host—e.g., at the hypervisor (where the address space transitions are between hypervisor spaces and compute instance spaces), and also at individual ones of the compute instances running at the virtualization host (where the address space transitions are between kernel spaces and user/application spaces).

Example System Environment

FIG. 1 illustrates an example processor, that supports more and less-privileged software components, in which hardware supported context-dependent address space hiding may be used to mitigate security vulnerabilities, according to at least some embodiments. As shown the system includes a processor 100 that comprises one or more execution units 120. The one or more hardware execution units 120 can be configured to execute program instructions for a plurality of software components including a more-privileged software component (140) and a plurality of less-privileged software components (130, 150). Each of the software components can have their own virtual address space, in some embodiments. The more-privileged software component can have a higher memory access privilege than the plurality of less-privileged software components, in some embodiments. The more-privileged software component can be configured to perform management tasks on behalf of the less-privileged software components using management data at one or more portions of a virtual address space to which the more-privileged software component has access, according to the higher memory access privilege.

The processor also comprises one or more registers (170, 172, 174, 176). The registers can be a part of the virtual-to-physical address translation mechanism 160, as shown, or they can be part of a different component of the CPU, and their placement in FIG. 1 should not be construed as limiting. The registers shown are the context register 170, the context-base register 172, the context-size register 174, and an enable bit 176. The enable bit 176 might be its own register, or it might be part of another one of the registers, depending on the embodiment. For example, the enable bit 176 might be placed at the end of the context register 170, in some embodiments. These registers can be solely accessible to and used by the more-privileged software component, and/or restricted for use to the more-privileged software component, in some embodiments.

The context-base register 172 stores location information for the one or more portions of the virtual address space that are used by the more-privileged software component to store management data for performing management tasks on behalf of the plurality of less-privileged software components. In some of these embodiments, this means that the context-base register holds the address of the $0^{th}$ CID. The context register 170 stores a determined identifier for the "in-context" less-privileged software component, to identify a subset of the one or more portions of the virtual address space that are used by the more-privileged software component to store management data for performing management tasks on behalf of the single "in-context" less-privileged software component. In some of these embodiments, this means that the context register holds the integer number identifier for the "in-context" CID. The CID can be a 16-bit unsigned integer, in some embodiments.

The processor 100 also comprises a virtual-to-physical address translation mechanism 160 that translates virtual addresses from one or more of the software components (130, 140, 150) into the physical address space 190. The address translation mechanism 160 can be configured to translate, for memory access instructions executed by the one or more hardware execution units, addresses in the virtual address space to addresses in a physical address space for accessing the physical memory. In order to translate an address in the virtual address space for a memory access, the address translation mechanism 160 can be configured perform the following tasks, described below in no particular order, unless otherwise noted below.

The address translation mechanism 160 can determine whether to apply context dependent memory access security. To make this determination, the address translation mechanism 160 might look at the enable bit 176, in some embodiments. Responsive to a determination to apply the context dependent memory access security, the address translation mechanism 160 can determine, based on contents of one or more of the hardware registers, whether the address in the virtual address space is within the subset of the one or more portions of the virtual address space corresponding to the "in-context" CID. The hardware registers that can be used are, for example, the context register 170 and/or the context-base register 172, in some embodiments.

Responsive to a determination the address in the virtual address space is within the subset of the one or more portions of the virtual address space corresponding to the "in-context" CID, the address translation mechanism 160 can allow translation of the address in the virtual address space to an address in the physical address space. Responsive to a determination that the address in the virtual address space is not within the subset of the one or more portions of the virtual address space corresponding to the "in-context" CID (or in other words within a portion of the virtual address space corresponding to an "out-of-context" CID), the address translation mechanism 160 can block the memory access, in some embodiments.

The memory allocated to each CID can be allocated at some fixed or configurable page multiple of the more-privileged virtual address space, starting from the address of the $0^{th}$ CID that is stored in the context-base register. In the fixed case, the size of the memory allocated to each CID is already known and fixed. In the configurable case, the hardware additionally provides a context-size register 174 which defines the number of translation granules reserved per CID. The context-size register 174 stores a size of the subset of the one or more portions of the virtual address space corresponding to a single less-privileged software component of the plurality of less-privileged software components reside. The enable-bit 174 enables the context dependent memory access security mechanism as a whole. When the enable bit is disabled, then the virtual-to-physical address translation mechanism allows the virtual to physical address translations as normal, without blocking the accesses to virtual memory associated with "out-of-context" CIDs, in some embodiments.

In some embodiments, all the registers described above might not be required. In some embodiments, one register might only be required to implement the functionality of hardware supported context-dependent address space hiding, as long as information that would be in the other registers is otherwise known. For example, in some embodiments, only the context-register is needed, as long as the memory allocated to each CID is fixed, and the starting address of the address range in the virtual address space, that is used by the more-privileged software component to store management data for performing management tasks on behalf of the plurality of less-privileged software components, is known. In other embodiments, only the context register and the enable bit are required. In other embodiments, only the context register, the enable bit, and the context-base register are required. There are many different combinations of registers that can be used for the functionality of hardware supported context-dependent address space hiding, and the register configuration shown in FIG. 1 should not be construed as limiting.

The execution units 130 shown in FIG. 1 comprise a single more-privileged software component 140, and a plurality of less-privileged software components (130, 150). The less privileged software component A 130 has a CID=0, and the less-privileged software component B has a CID=1. There can be other less-privileged software components in the execution units, in some embodiments, whose CID number would increase by 1 for every additional less-privileged software component. Each of the software components comprises their own virtual address space, in some embodiments, where certain portions of the virtual address space are mapped to the physical address space by the virtual-to-physical translation mechanism 160. The more-privileged software component 140 has a higher memory access privilege than the plurality of less-privileged software components, wherein the higher memory access privilege provides access to one or more portions of the virtual address space.

Responsive to a call for a management task from the first less-privileged software component, which would be the "in-context" software component, the more privileged software component of the computing device can perform a series of tasks, described as follows not in any particular order. The more privileged software component can determine an identifier for the first less-privileged software component. The more privileged software component can enable a context dependent memory access security mechanism. The more privileged software component can do this by, for example, setting the enable bit 176 to enable. The more privileged software component can program the context-register according to the determined identifier for the first less-privileged software component to identify the subset of the one or more portions of the virtual address space corresponding to the first less-privileged software component. The more privileged software component can access the subset of the one or more portions of the virtual address space to perform the management task, where the context dependent memory access security mechanism blocks any memory access attempts to the one or more portions of the virtual address space not in the subset. Subsequent to completion of the management task, the more privileged software component can disable the context dependent memory access security mechanism, and return an execution context to the first less-privileged software component.

Figure 2:
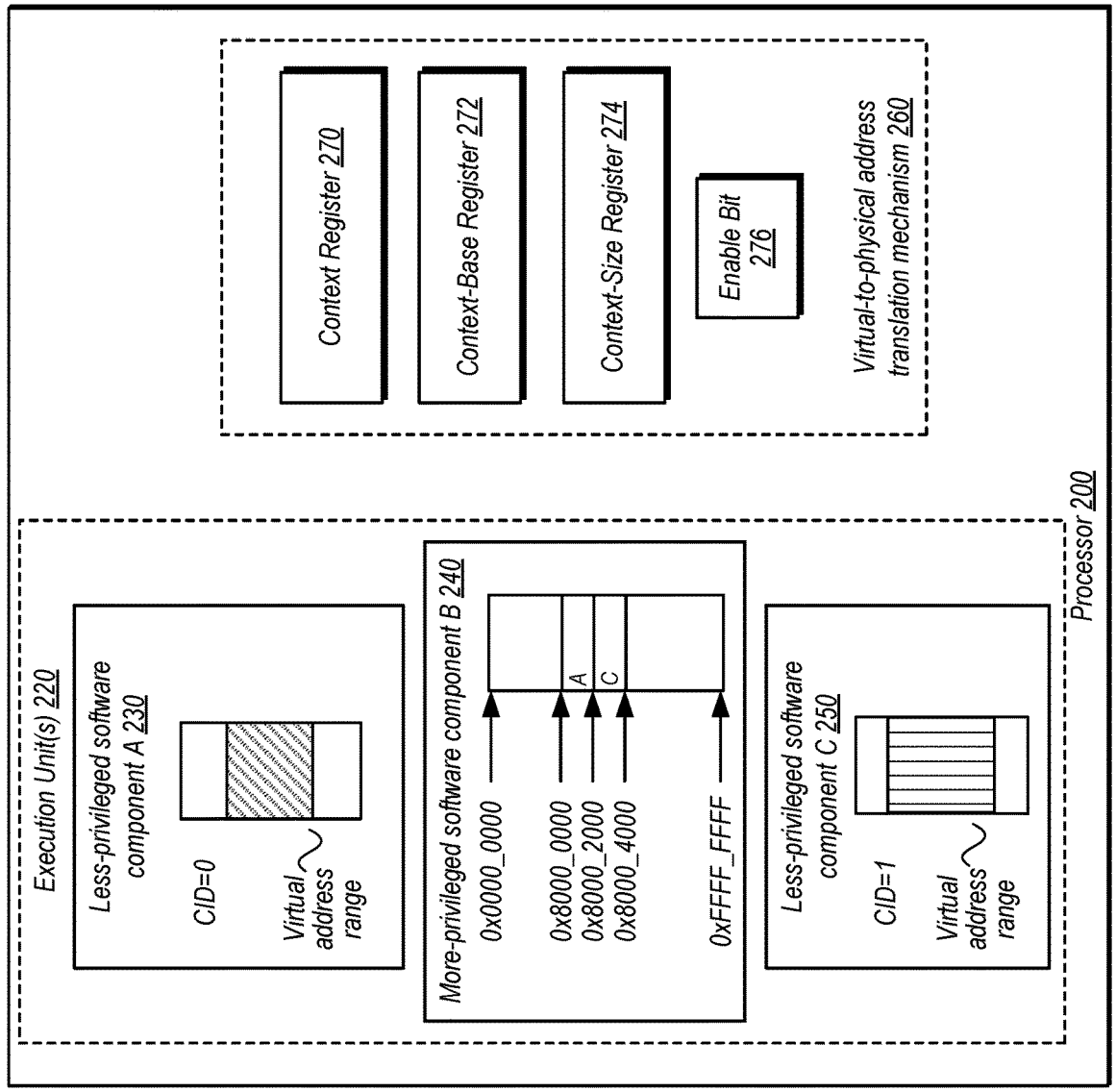
FIG. 2 illustrates an example system environment, and an example register configuration and more-privileged software component execution process, in which hardware supported context-dependent address space hiding may be used to mitigate security vulnerabilities at a processor that support more and less-privileged software components, according to at least some embodiments.

FIG. 2 illustrates an example system environment, and an example register configuration and more-privileged software component execution process, in which hardware supported context-dependent address space hiding may be used to mitigate security vulnerabilities at a processor that support more and less-privileged software components, according to at least some embodiments. The processor 200 includes one or more execution units 220. The one or more hardware execution units 120 can be configured to execute program instructions for a plurality of software components including a more-privileged software component B (240), and plurality of less-privileged software components A & C (230 & 250). The virtual-to-physical address translation mechanism 260 operates as in FIG. 1. As in FIG. 1, the registers shown are the context register 170, the context-base register 172, the context-size register 174, and an enable bit 176. Different embodiments might have fewer or more registers than the ones depicted in FIG. 2. The registers might be part of the virtual-to-physical address translation mechanism 260, or they might be part of another component, or they might simply be registers that are not part of any component of the processor 200. These registers can be solely accessible to and used by the more-privileged software component, and/or restricted for use to the more-privileged software component, in some embodiments.

In order to initialize the system, as shown in FIG. 2 according to some embodiments, the more-privileged software component B (240) can be responsible for initializing the less-privileged software components A and C (230 & 250). In addition, the more-privileged software component B can set the context-base register (272). In the example shown in FIG. 2, B sets the context-base register (272) to be 0x8000_0000. In addition, the more-privileged software component B can set the context-size register, in some embodiments. In the example shown in FIG. 2, B sets the context-size register (274) to be 0x0000_2000. In addition, the more-privileged software component B can place metadata associated with less-privileged software component A at the address (CID of A*context-size register)+contest-base register. In the example shown in FIG. 2, this address range is 0x8000_0000 to 0x8000_2000. In addition, the more-privileged software component B can place metadata associated with the less-privileged software component C at the address (CID of C*context-size). In the example shown in FIG. 2, this address range is 0x8000_2000 to 0x8000_4000.

Subsequent to the inialization, when with less-privileged software component A is executing, A can call an SVC instruction, for example, which causes a context-switch to execution of the more-privileged software component B. More-privileged software component B can then program the context-register to the CID of the "in-context" less-privileged software component A, in some embodiments. In the example shown in FIG. 2, B programs the context register to 0, which is the CID of less-privileged software component A. More-privileged software component B can set the enable-bit to enable "1", in some embodiments. More-privileged software component B might attempts to access "in-context" metadata for less-privileged software component A. As shown in FIG. 2, this would be data within the 0x8000_0000 to 0x8000_2000 address range. When B attempts to access this metadata, then the virtual-to-physical address translation mechanism allows the access and provides the address translation. More-privileged software component B might attempts to access "out-of-context" metadata for less-privileged software component C. As shown in FIG. 2, this would be data within the 0x8000_2000 to 0x8000_4000 address range. When more-privileged software component B attempts to access this "out-of-context" metadata (e.g., metadata for less-privileged software component C, for example), then it is denied with a translation fault by the virtual-to-physical address translation mechanism 260, in some embodiments.

Figure 3:
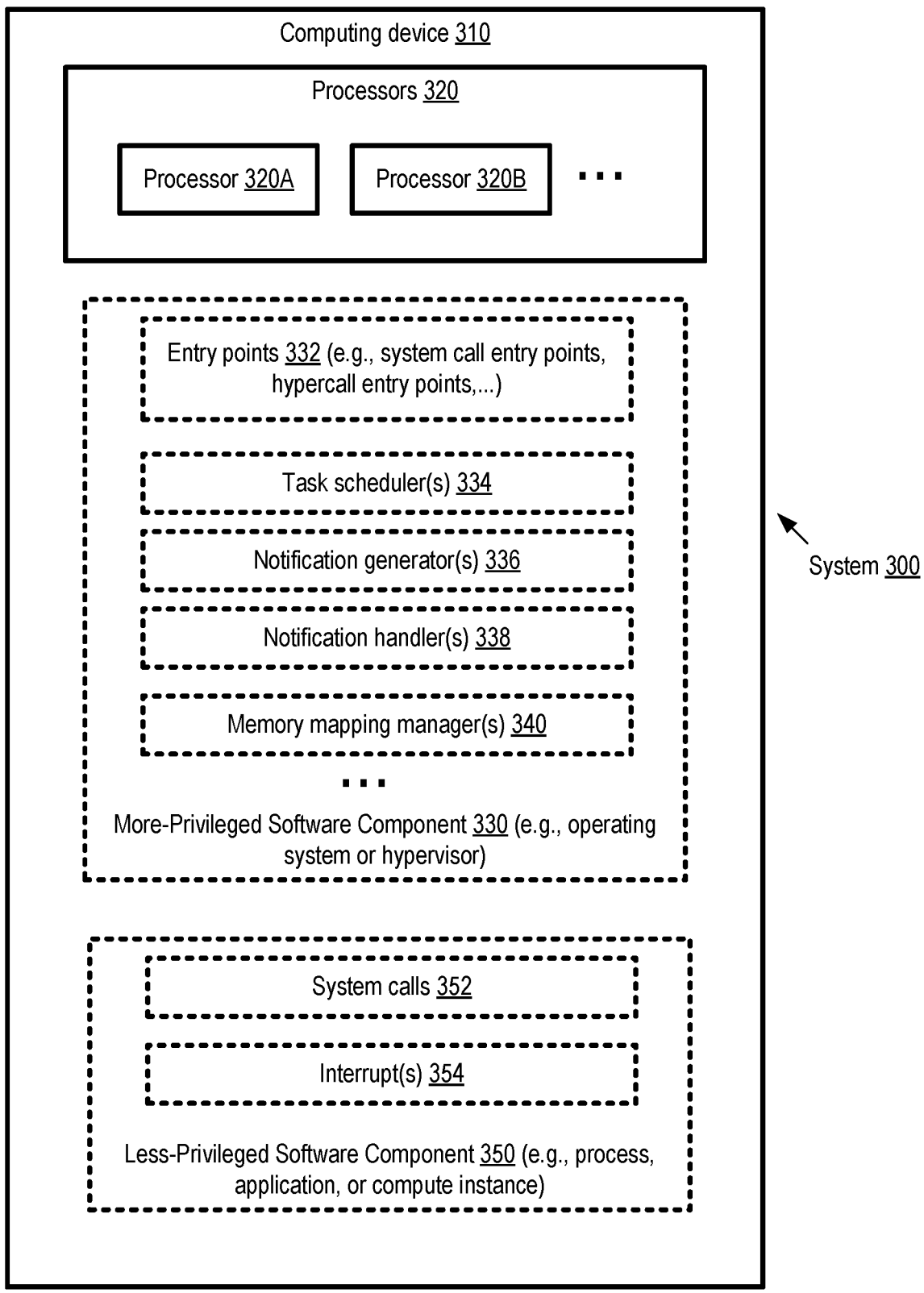
FIG. 3 illustrates an example computing device environment in which hardware supported context-dependent address space hiding may be used to mitigate security vulnerabilities at processors that support more and less-privileged software components, where specific functionality of more and less-privileged software components are detailed, according to at least some embodiments.

FIG. 3 illustrates an example computing device environment in which hardware supported context-dependent address space hiding may be used to mitigate security vulnerabilities at processors that support more and less-privileged software components, where specific functionality of more and less-privileged software components are detailed, according to at least some embodiments. As shown, system 300 comprises a computing device 310 which in turn includes one or more processors 320 (such as processors 320A and 320B). Computing device 310 also includes a more-privileged software component 330 responsible for, among other operations, scheduling sequences of program instructions at the hardware threads of the processors 320. A number of different types of more-privileged software components may be employed in different embodiments, depending on the kinds of applications and workloads to be run at the computing device 310—e.g., in some embodiments, a more-privileged software component may comprise an operating system of a non-virtualized host, while in other embodiments a more-privileged software component may comprise a hypervisor configured to act as an intermediary between hardware elements of the computing device and one or more compute instances such as guest virtual machines. In various embodiments, the computing device 310 may comprise a memory storing program instructions that when execute on or across one or more of the processors 320 implement the functionality of the more-privileged software component 330.

In the embodiment depicted in FIG. 3, each of the processors 320 may comprise one or more hardware threads, and the more-privileged software component 330 may be responsible for implementing hardware support for context-dependent address space hiding with respect to the set of hardware threads of at least one of the processors. Components of the more-privileged software component involved in the implementation of hardware support for context-dependent address space hiding may include, for example, entry points 332 (e.g., system call entry points, virtualization call (hyper-call) entry points, and the like), task scheduler(s) 334, notification generators(s) 336, notification handler(s) 338 and/or memory mapping manager(s) 340. Individual ones of such more-privileged software component components may, for example, be implemented by executing program instructions corresponding to a given set of programs, functions, methods, or the like in various embodiments.

In the embodiment depicted in FIG. 3, a plurality of less-privileged software components 350 can interact with the more-privileged software component 330. A less-privileged software component (350) can be, for example, a process, application, or a virtual compute instance, depending on the embodiment. The less-privileged software component (350) can make a system call 352, or produce an interrupt 354 to the more-privileged software component 330, in some embodiments. In some embodiments, these system calls 352 and/or interrupts 354 can cause a context switch to the more-privileged software component (330) at one of the entry points (332), or one of the notification handlers (338).

In order to reduce the overhead associated with hardware support for context-dependent address space hiding (which may for example involve spinning at a given hardware thread until access to an address space is obtained at another hardware thread), in at least some embodiments various types of cross-address-space memory mappings may be implemented to enable objects typically accessed in one address space to be accessed from another address space. According to some embodiments, a memory mapping manager 340 subcomponent of the more-privileged software component 330 may generate a mapping of a first data object (DO1) from a first address space (AS1) to a second address space (AS2). In some cases, access to DO1 may require a first privilege level PL1 (e.g., kernel-level or administrative privilege), and access to a second data object DO2 of the second address space AS2 may require a different privilege level (e.g., user or application level privilege). In other cases, a mapping may be generated for a data object DO1 that requires the same privilege level as other objects (e.g., DO2) of the mapping's target address space. Note that hardware support for context-dependent address space hiding may be implemented in at least some embodiments without necessarily performing memory mappings of the kind indicated above. In some embodiments, determinations regarding impending changes to address space access requirements may be made at other components of the more-privileged software component (in addition to entry points 332), such as exception handlers, interrupt handlers (which represent one example of notification handlers 338), VMEXIT handlers (corresponding to transitions between the operations of a virtual machine and a hypervisor), and so on.

According to some embodiments, the computing device 310 may be part of a fleet of resources of a network-accessible computing service, e.g., implemented at a provider network or cloud computing environment. In one such embodiment, a client of the computing service may submit a programmatic request indicating a trusted group of programs or processes (e.g., several different compute instances or guest virtual machines set up on behalf of the client). Instruction streams that belong to such a trusted group of processes or programs may implement hardware supported context-dependent address space hiding at the same processor in some embodiments, e.g., in preference to instruction streams that do not belong to the same trusted group.

Example Data Accessed at Operating Systems on Behalf of User-Mode Programs

Figure 4:
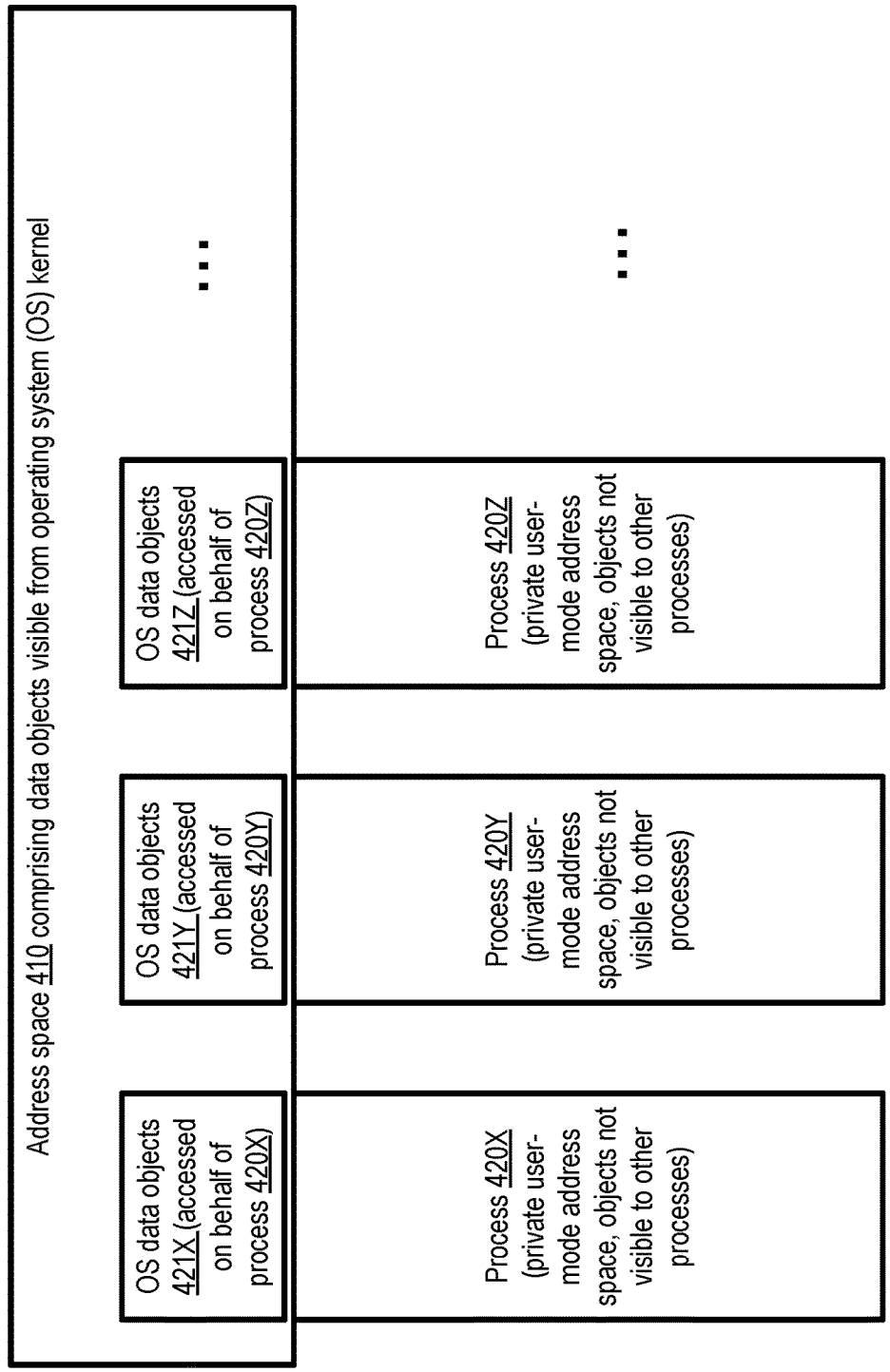
FIG. 4 illustrates examples of data objects that may be accessed by operating system components on behalf of various user-mode application processes, according to at least some embodiments.

FIG. 4 illustrates examples of data objects that may be accessed by operating system components on behalf of various user-mode application processes, according to at least some embodiments. In some embodiments, as mentioned earlier, data objects may be mapped from one address space (e.g., an operating system's address space) to another (e.g., an application process's address space) to reduce the frequency with which address space transitions synchronizations are needed while implementing hardware support for context-dependent address space hiding. FIG. 4 illustrates examples of data objects that may be accessed by operating system components on behalf of various user-mode application processes, according to at least some embodiments. In the depicted embodiment, a number of application processes 420, such as 420X, 420Y and 420Z may be running at a non-virtualized computing device on top of a shared operating system. Individual ones of the processes 420 may have a respective private user-mode address space accessible, with the objects within that private address space (which require only user-mode privilege or permissions) not being accessible from the other processes.

At various points during the execution of a given process 420, a system call may be invoked, and instructions of the operating system may be executed on behalf of the process. During such periods of operating system execution, some set of operating system (OS) data objects 421 from within an address space 410 (for which kernel privileges are required) may be accessed on behalf of a process 420—e.g., OS data objects 421X may be accessed on behalf of process 420X, OS data objects 421Y may be accessed on behalf of process 420Y, and OS data objects 421Z may be accessed on behalf of process 420Z. In at least some embodiments, it may be possible for a component of the more-privileged software component, such as a memory manager, to map some of the data objects 421 into the corresponding process's address space, without any negative side effects (e.g., a given OS data structure may not reveal any sensitive data that can be misused by the application code of the process). By implementing such mappings, the average number of instructions run without requiring address space transitions may be increased, thereby reducing the overhead associated with synchronizations of address space transitions in such embodiments.

Example Data Accessed at Hypervisors on Behalf of Compute Instances

Figure 5:
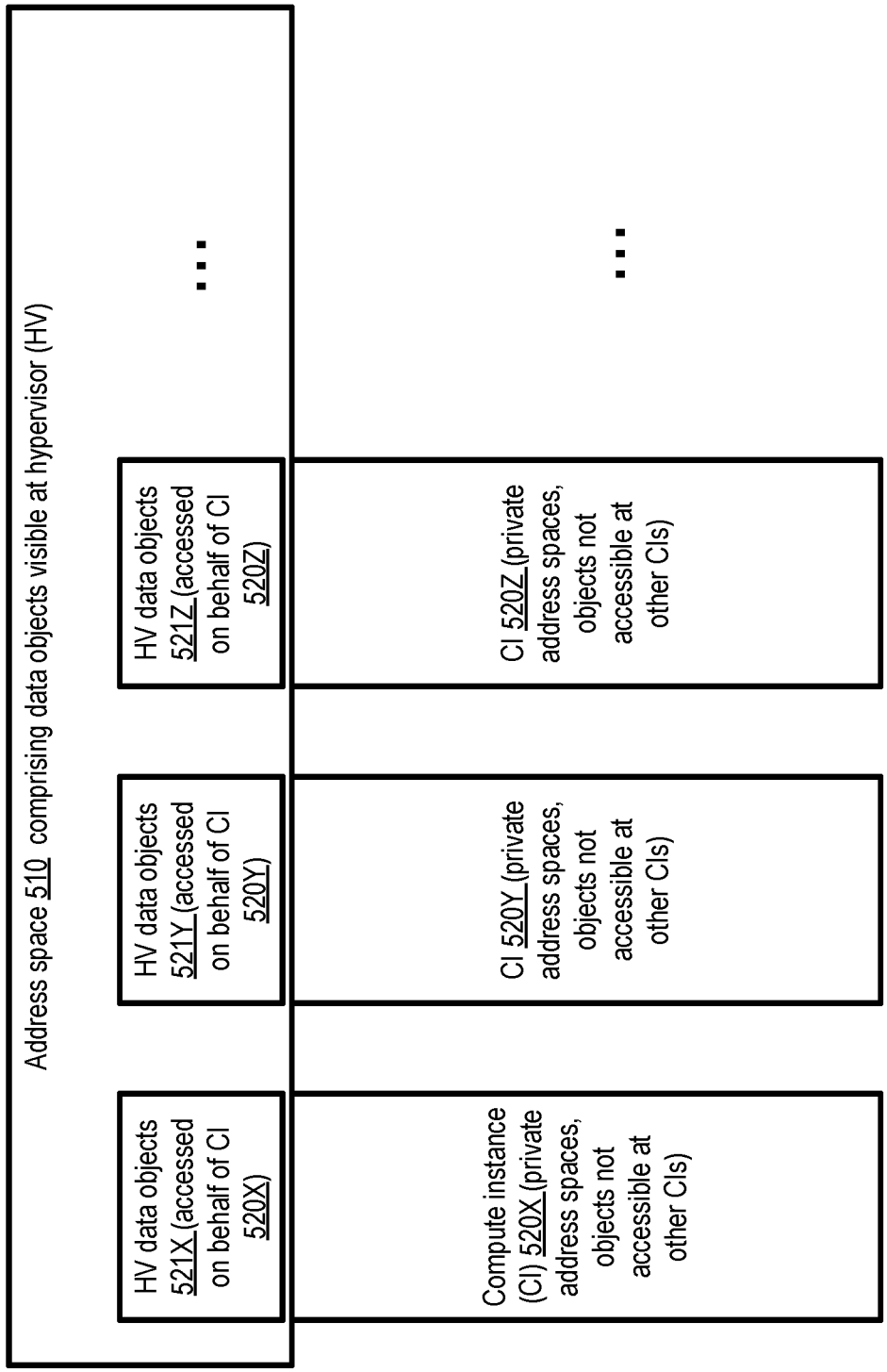
FIG. 5 illustrates examples of data objects that may be accessed by hypervisor components on behalf of various compute instances running at a virtualization host, according to at least some embodiments.

FIG. 5 illustrates examples of data objects that may be accessed by hypervisor components on behalf of various compute instances running at a virtualization host, according to at least some embodiments. Just as data objects within an operating system's address space may be accessed on behalf of application processes, as discussed in the context of FIG. 4, data objects within a hypervisor's address space may be accessed on behalf of compute instances. FIG. 5 illustrates examples of data objects that may be accessed by hypervisor components on behalf of various compute instances running at a virtualization host, according to at least some embodiments. In the depicted embodiment, a number of compute instances 520, such as 520X, 520Y and 520Z may be running at virtualization host with the help of a hypervisor and/or other virtualization management components such as a virtualization management offloading card. Individual ones of the compute instances 520, each of which may for example comprise a guest virtual machine, may have a respective collection of private address spaces (which may include an operating system's address space as well as one or more application address spaces), with the objects within those private address spaces not being accessible from the other compute instances.

At various points during the execution of a given compute instance 520, a virtualization management related operation may have to be performed by the hypervisor, and instructions of the hypervisor may be executed on behalf of the compute instance. Such phases of hypervisor activity may be triggered, for example, by VMEXITs caused by hypercalls, exceptions, interrupts or the like. During such periods of hypervisor code execution, some set of hypervisor (HV) data objects 521 from within an address space 510 (normally inaccessible from outside the hypervisor) may be accessed on behalf of a compute instance 520—e.g., HV data objects 521X may be accessed on behalf of CI 520X, HV data objects 521Y may be accessed on behalf of CI 520Y, and HV data objects 521Z may be accessed on behalf of process 520Z. In at least some embodiments, it may be possible for an SEAM component such as a memory manager of the hypervisor to map some of the data objects 521 into the corresponding CI's address space, without any negative side effects (e.g., a given HV data structure may not reveal any sensitive data that can be misused by the code of the CI). By implementing such mappings, the average number of instructions run without requiring address space transitions between hypervisors and compute instances may be increased, thereby reducing the overhead associated with synchronizations of address space transitions in such embodiments.

Example Virtualization Host

Figure 6:
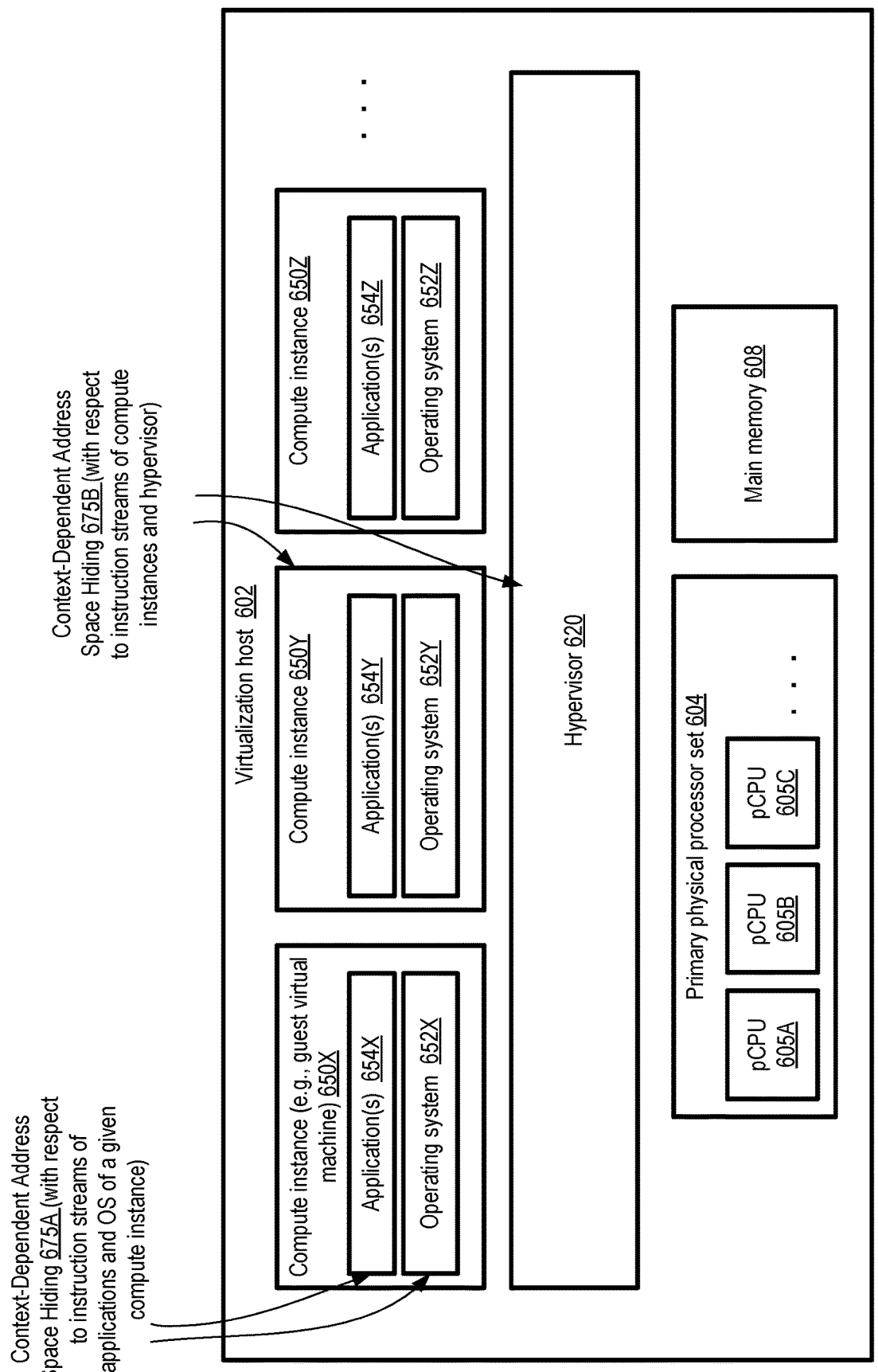
FIG. 6 illustrates example elements of a virtualization host at which one or more types of hardware supported context-dependent address space hiding may be implemented, according to at least some embodiments.

FIG. 6 illustrates example elements of a virtualization host at which one or more types of hardware supported context-dependent address space hiding may be implemented, according to at least some embodiments. In at least some embodiments, as indicated earlier, hardware support for context-dependent address space hiding may be implemented at virtualization hosts. As shown, virtualization host 602 may comprise a primary physical processor set 604, and a main memory 608. Software components of the virtualization host 602 may include a hypervisor 620 and a set of compute instances, such as compute instances 650X, 650Y and 650Z, each of which comprise a respective operating system 652 (e.g., 652X, 652Y or 652Z) and one or more applications 654 (e.g., 654X, 654Y or 654Z). A given compute instance may, for example, comprise a respective guest virtual machine in the depicted embodiment. The hypervisor 620 (which may comprise software running on the primary SMT physical processor set) may be configured as an intermediary between the compute instances 650 and hardware components of the host, including the physical processors (pCPUs) 605X, 605Y and 605Z, as well as main memory 608 and networking hardware components such as one or more network interface cards (NICs) not shown in FIG. 6.

In the depicted embodiment, address space transitions may be required, and hardware support for context-dependent address space hiding may be performed, at several levels. For example, in hardware support for context-dependent address space hiding type 675A, components of the respective operating systems 652 of the compute instances 650 may ensure, while a given instruction stream of the operating system is scheduled for execution at a given hardware thread of a virtualized representation of a pCPU, that portions of the operating system virtual memory which pertain to "out-of-context" applications 654 are not allowed to be accessed. This level of hardware support for context-dependent address space hiding, 675A, may be performed with respect to transitions between application code and operating system code, for example.

In a second type of hardware support for context-dependent address space hiding, 675B, the transitions may involve virtual machines and the hypervisor. As such, the execution of the less-privileged software component virtual machine instructions (with respect to type 675B) may be considered analogous to the execution of less-privileged software component application instructions (with respect to type 675A), while the execution of the more-privileged software component hypervisor instructions (with respect to type 675B) may be considered analogous to the execution of more-privileged software component operating system instructions (with respect to type 675A). In at least some embodiments, the hypervisor 620 may include components such as entry points, task schedulers, notification generators, notification handlers and memory mapping managers which collectively perform the operations needed to implement context-dependent address space hiding 675B, while each of the operating systems 652 may similarly comprise its own set of components such as entry points, task schedulers, notification generators, notification handlers and memory mapping managers which collectively perform the operations needed to implement context-dependent address space hiding type 675A. The more-privileged software components can have a certain set of banked registers for their use in implementing the context-dependent address space hiding type. For example, the more-privileged software component hypervisor 620 can use a set of banked registers for its context-register, context-size register, and context-base register. The more-privileged software component operating system 652 can have a separate set of banked registers that it uses for its context-register, context-size register, and context-base register, such that it does not interfere with the banked registers of the more-privileged software component hypervisor 620.

Before allowing an instruction stream corresponding to a given compute instance to be executed on a given hardware thread of a pCPU 605, the hypervisor 620 may ensure that, while a given instruction stream of the hypervisor is scheduled for execution at a given hardware thread of a virtualized representation of a pCPU, that portions of the hypervisor's virtual memory which pertain to "out-of-context" compute instances 650 are not allowed to be accessed. One potential example of a VMEXIT that could benefit from this approach is the CPUID instruction emulation. This may be executed in at least some embodiments in a very restricted address space without forcing hardware threads out of virtual machine mode (i.e., without requiring a transition to the hypervisor's address space). This is also true for several other instructions that require emulation, such as the equivalents of rdmsr (read from model specific register) and wrmsr (write to model specific register) instructions. Note that in some embodiments, hardware support for context-dependent address space hiding at both levels 675A and 675B may be implemented at a virtualization host that does not include a VMOC.

In some embodiments, hardware support for context-dependent address space hiding may be implemented at more than two levels in a virtualized computing environment. For example, a compute instance 650 may itself comprise a second-level hypervisor or virtualization manager (i.e., the more-privileged software component), and one or more of the application(s) 654 may themselves comprise respective virtual machines (i.e., the less-privileged software component). In such an environment, the task scheduler at each hypervisor or virtualization manager, regardless of its level in the virtualization hierarchy, may ensure that its instruction streams implement hardware supported context-dependent address space hiding. In some embodiments, the instruction streams can use register banking, such that a certain "bank" of registers are available to the more-privileged software component depending on its level in the virtualization hierarchy, as explained above.

Figure 7:
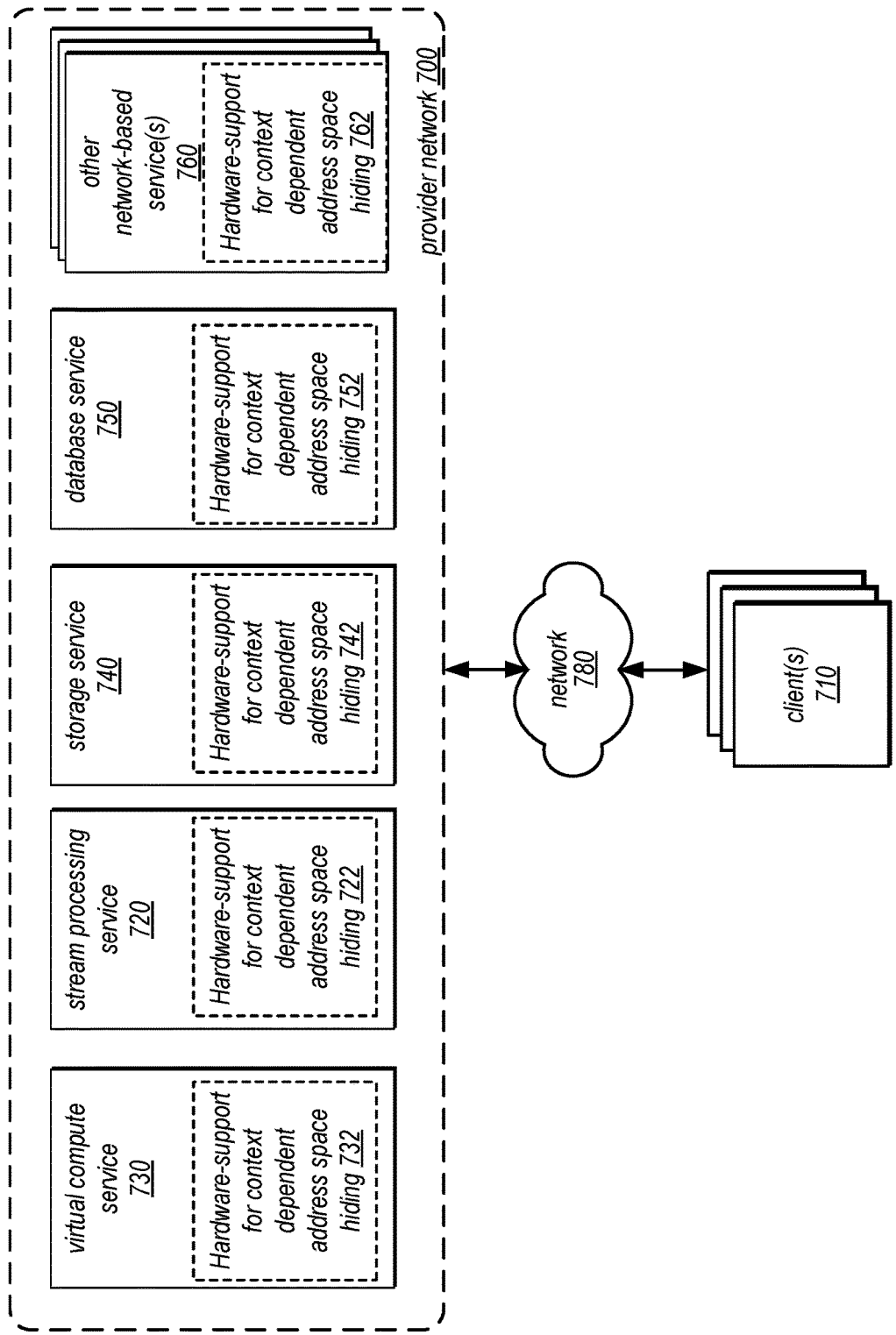
FIG. 7 is a logical block diagram illustrating a provider network where processors executing services within the provider network provide for hardware supported context-dependent address space hiding, according to at least some embodiments.

FIG. 7 is a logical block diagram illustrating a provider network where processors executing services within the provider network provide for hardware supported context-dependent address space hiding, according to at least some embodiments. FIG. 7 is a logical block diagram illustrating a provider network that implements a number of services, include a stream processing service 720, according to at least some embodiments. Provider network 700 may be set up by an entity such as a company or a public sector organization to provide one or more services (such as various types of cloud-based computing or storage) accessible via the Internet and/or other networks to clients 710. Provider network 700 may include numerous data centers hosting various resource pools, such as collections of physical and/or virtualized computer servers, storage devices, networking equipment and the like (e.g., computing system 1200 described below with regard to FIG. 12), needed to implement and distribute the infrastructure and services offered by the provider network 700. In some embodiments, provider network 700 may implement a variety of services, including a stream processing service 720, provide computing resources, such as virtual compute service 730, and storage services 740, such as object storage services, block-based storage services, data warehouse storage services, database service 750, and/or any other type of network based services 760 (which may include various other types of storage, processing, analysis, communication, event handling, visualization, and security services). Each of these services can implement hardware-support for context dependent address space hiding (732, 722, 742, 752, 762) for the processors that are associated with their service.

Clients 710 may access these various services offered by provider network 700 via network 780. Likewise network-based services may themselves communicate and/or make use of one another to provide different services. For example, computing resources offered to clients 710 in units called "instances," such as virtual or physical compute instances or storage instances, may be implemented as data producers or data consumers for a data stream processed by stream processing service 720 and services such as storage service 740, may serve as destinations for data records in the data stream, providing virtual block storage for the compute instances.

As noted above, virtual compute service 730 may offer various compute instances to clients 710. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 730 in different embodiments, including special purpose computer servers, storage devices, network devices and the like. The processors of these computing devices can implement hardware-support for context dependent address space hiding (732). In some embodiments instance clients 710 or any other user may be configured (and/or authorized) to direct network traffic to a compute instance. In various embodiments, compute instances may attach or map to one or more data volumes provided by a block-based storage service (not illustrated) in order to obtain persistent block-based storage for performing various operations.

Compute instances may operate or implement a variety of different platforms, such as application server instances, Java™ virtual machines (JVMs), special-purpose operating systems, platforms that support various interpreted or compiled programming languages such as Ruby, Perl, Python, C, C++ and the like, or high-performance computing platforms) suitable for performing client applications, without for example requiring the client 710 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

Storage service 740 may include various types of storage services, such as different types of storage schemes. An object-based data store may be implemented, in various embodiments, to provide highly durable storage for data objects, such as data records stored as part of a data stream managed by stream processing service 720. Database service 750 can implement various types of databases. For instance, the object-based database may be implemented as a key-value database, where a data object is associated with a unique key. The key for the data object is used to access or manage the data object stored in the object-based database. Storage service 740 may also include a data warehouse, in various embodiments, to set up, operate, and scale a data warehouse in a cloud computing environment. Data warehouse clusters hosted by the data warehouse may provide an enterprise-class database query and management system that allows users to scale the clusters, such as by sending a cluster scaling request to a cluster control interface implemented by the web-service. Scaling clusters may allow users of the web service to perform their data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, sub-queries, and aggregation, more efficiently. Storage service 740 may include various types of database systems and other data store schemes, such as a NoSQL database or various types of relational database systems. In at least some embodiments, updates or other interactions with storage service 740 may be a source for one or multiple data streams for processing by stream processing service 720.

Stream processing service 720 may provide programmatic interfaces (e.g., application programming interfaces (APIs), web pages or web sites, graphical user interfaces, or command-line tools) to enable the creation, configuration and deletion of streams. The programmatic interfaces may also enable the submission, storage, analysis, transformation and/or retrieval of streaming data records in some embodiments. Some clients of the stream management system may develop applications that directly invoke the stream management system programmatic interfaces in various embodiments. For example, stream processing service 720 may implement a data ingestion system configured to obtain data records of a particular data stream from data producers (e.g., by operating one or multiple ingestion nodes for a data stream). In some embodiments, data records of a stream may be obtained according to a scheme for partitioning the data stream. The partitioning scheme may be selected by a client of stream processing service 720 for a data stream such that data records are received from data producer(s) indicating the particular partition to which the data record belongs. However, in some embodiments, a data stream may be fully managed by stream processing service 720 and data producer(s) may send data records without any direction for partitioning. Instead, the data ingestion system may assign data records to route the data records to identified partition. Once ingested, stream processing service may store obtained data records (e.g., on corresponding storage nodes provisioned for the data stream). Such storage nodes may record, save, store or otherwise persist the data records on any of various types of storage devices (which may be performed in accordance with a persistence policy for the data stream).

In order to retrieve data from the data stream, stream processing service may provide a retrieval system (e.g., implementing retrieval nodes) that may access the stored data records of the data stream. In some embodiments, data retrieval may be performed in response to request from consumers (e.g., stream processing nodes that perform processing on data stream data). Stream processing service 720 may provide an interface that supports one or more sets of programmatic interfaces (e.g., application programming interfaces (APIs), web pages or web sites, graphical user interfaces, or command-line tools) to enable the creation, configuration and deletion of data streams (both client-managed or fully-managed), as well as the submission, storage and retrieval of stream data records in some embodiments. For instance, data producers may be configured to place data records into a data stream by utilizing a client library provided by stream processing service 720 to utilize requests, sending a "putRecord" request to stream processing service 720 via the interface. Similarly, data consumer(s) may be configured to access stream processing service 720 via the interface and utilize the client library provided by stream processing service 720 to "getNextRecords" when executing an application to retrieve the next data records to be processed in the data stream.

Other network-based services 760 may include various services, including services configure networking of client provider network resources (e.g., load balancing), security (e.g., firewalls, access control), communication (e.g., notification or messaging systems), event driven execution services, visualization services or services for further data processing. Clients 710 may encompass any type of client configurable to submit requests to network provider 700. For example, a given client 710 may include a suitable version of a web browser, or may include a plug-in module or other type of code module configured to execute as an extension to or within an execution environment provided by a web browser. Alternatively, a client 710 may encompass an application such as a database application (or user interface thereof), a media application, an office application or any other application that may make use of compute instances, a data volume, or other network-based service in provider network 700 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 710 may be configured to generate network-based services requests according to a Representational State Transfer (REST)-style network-based services architecture, a document- or message-based network-based services architecture, or another suitable network-based services architecture. In some embodiments, a client 710 (e.g., a computational client) may be configured to provide access to a compute instance or data volume in a manner that is transparent to applications implement on the client 710 utilizing computational resources provided by the compute instance or block storage provided by the data volume.

Clients 710 may convey network-based services requests to provider network 700 via external network 780. In various embodiments, external network 780 may encompass any suitable combination of networking hardware and protocols necessary to establish network-based communications between clients 710 and provider network 700. For example, a network 780 may generally encompass the various telecommunications networks and service providers that collectively implement the Internet. A network 780 may also include private networks such as local area networks (LANs) or wide area networks (WANs) as well as public or private wireless networks. For example, both a given client 710 and provider network 700 may be respectively provisioned within enterprises having their own internal networks. In such an embodiment, a network 780 may include the hardware (e.g., modems, routers, switches, load balancers, proxy servers, etc.) and software (e.g., protocol stacks, accounting software, firewall/security software, etc.) necessary to establish a networking link between given client 710 and the Internet as well as between the Internet and provider network 700. It is noted that in some embodiments, clients 710 may communicate with provider network 700 using a private network rather than the public Internet.

Figure 8:
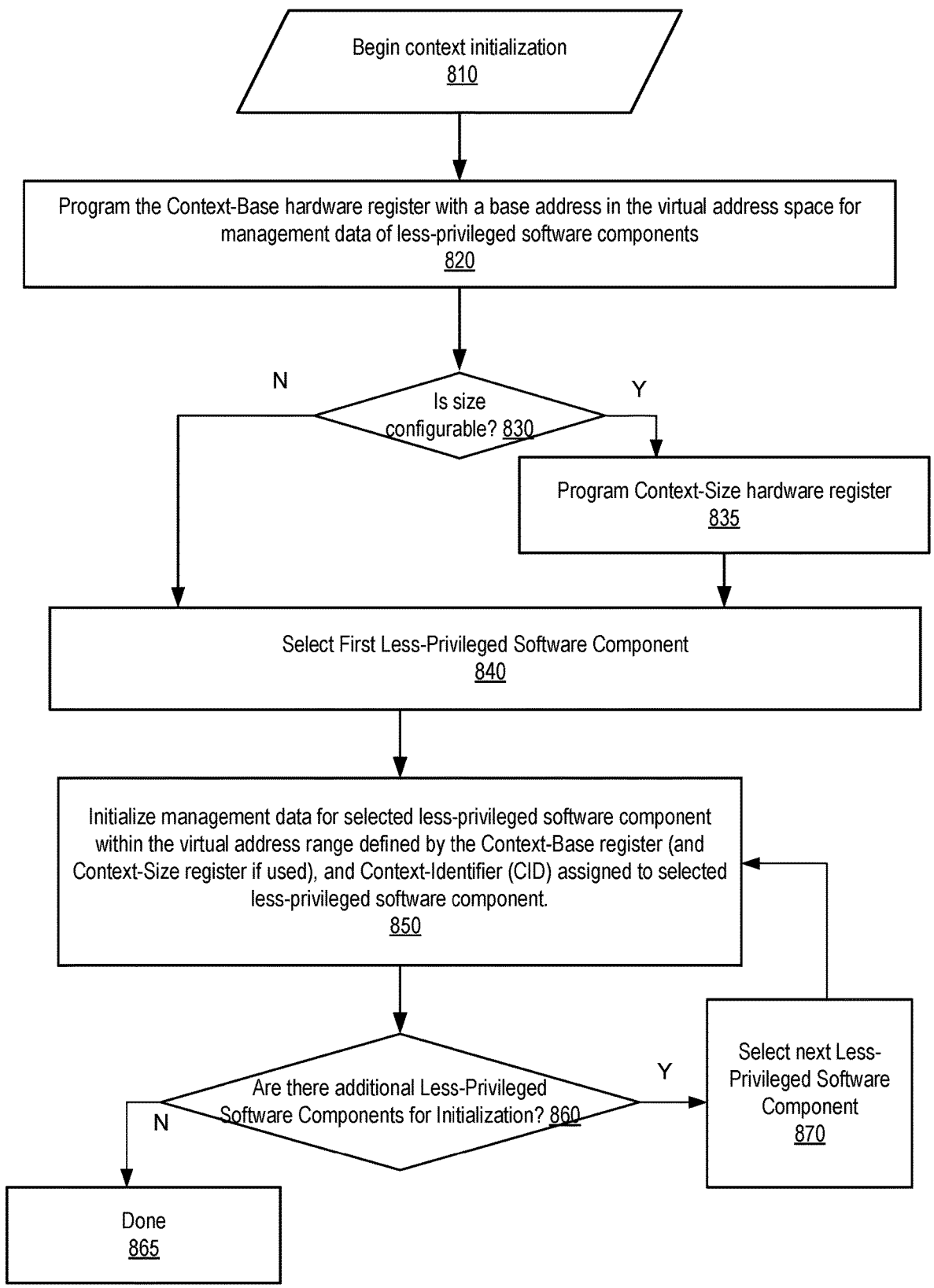
FIG. 8 is a flow diagram illustrating aspects of context initialization operations that may be performed by a more-privileged software component implementing hardware supported context-dependent address space hiding, according to at least some embodiments.

Methods for Implementing Hardware Support for Context-Dependent Address Space Hiding FIG. 8 is a flow diagram illustrating aspects of context initialization operations that may be performed by a more-privileged software component implementing hardware supported context-dependent address space hiding, according to at least some embodiments. The flowchart begins at 810 where the more-privileged software component begins context initialization. Then, at block 820, the more-privileged software component programs the context-base hardware register with a base address in the virtual address space for management data of less-privileged software components. The flowchart transitions to block 830 which determines whether the size of the management data for less-privileged software components is configurable or not. If the size of the management data is not configurable, then the flowchart transitions straight to block 840. If the size is configurable, then the more-privileged software component programs a context-size hardware register at block 835, before transitioning to block 840.

At block 840, the more-privileged software component selects a first less-privileged software component. The flowchart transitions to block 850 where the more-privileged software component initializes management data for selected less-privileged software component within the virtual address range defined by the context-base register (and context-size register if used), and context-identifier ("CID") assigned to selected less-privileged software component. This CID can be stored in the context-register, in some embodiments. The flowchart then transitions to block 860 which determines if there are more less-privileged software components for initialization. If there are none, then the flowchart is done at block 865. If there are more less-privileged software components, then the flowchart transitions to block 870 which selects the next less-privileged software component 870 before transitioning black to block 850 to repeat the process.

Figure 9:
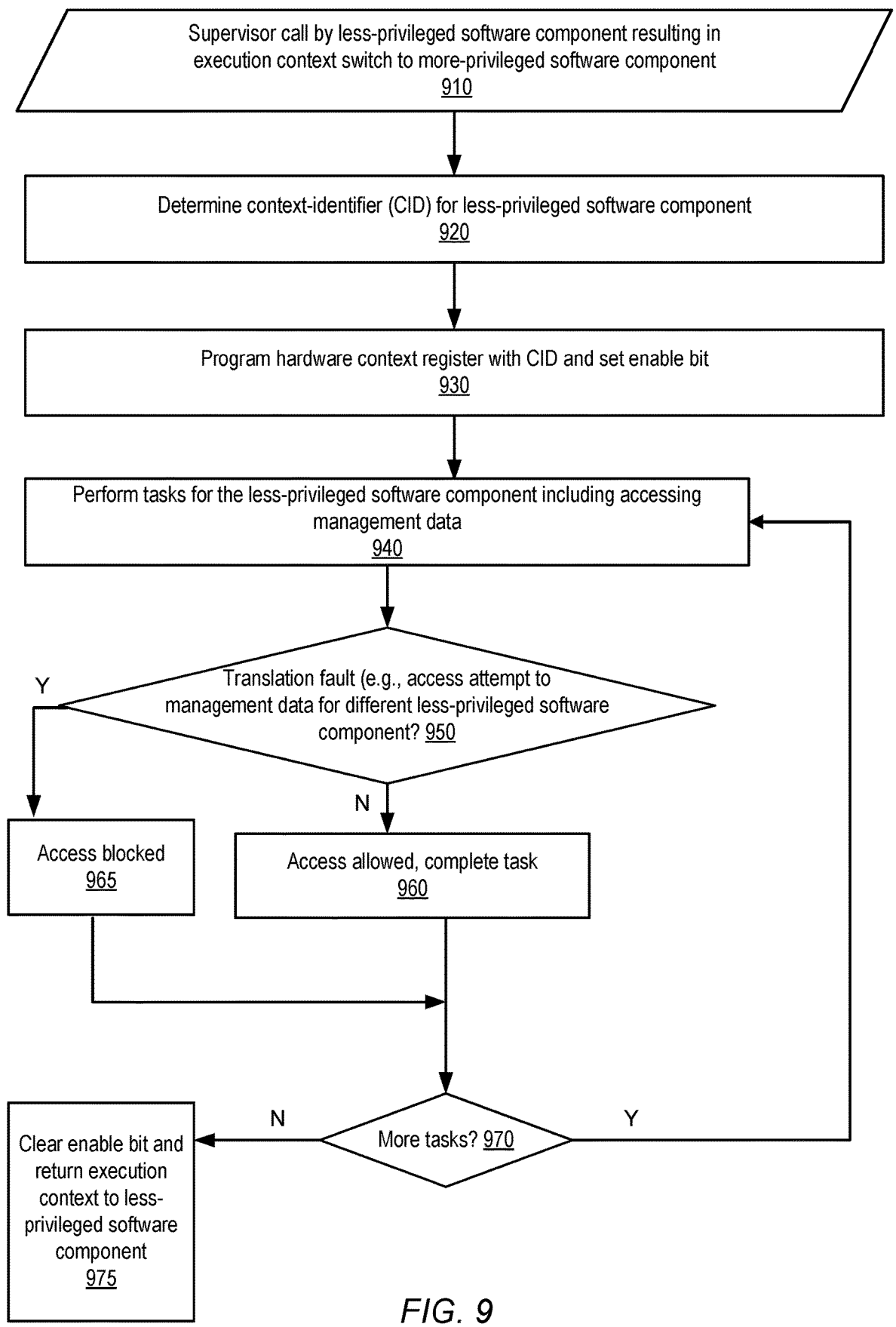
FIG. 9 is a flow diagram illustrating aspects of operations that may be performed by a more-privileged software component implementing hardware supported context-dependent address space hiding, when a less-privileged software component calls the more-privileged software component resulting in an execution context switch, according to at least some embodiments.

FIG. 9 is a flow diagram illustrating aspects of operations that may be performed by a more-privileged software component implementing hardware supported context-dependent address space hiding, when a less-privileged software component calls the more-privileged software component resulting in an execution context switch, according to at least some embodiments. The flowchart begins at 910, where a supervisor call by a less-privileged software component results in an execution context switch to the more-privileged software component. The flowchart transitions to block 920 where the more-privileged software component determines the CID for the less-privileged software component. At 930, the more-privileged software component programs a hardware context register with the CID. The more-privileged software component can also set an enable bit to enable, if needed. As mentioned previously, the enable mechanism being a "bit" is only an embodiment, and should not be construed as limiting. The enable mechanism might be an entire register, a memory location, or simply knowledge my the software and/or hardware whether the current execution context is the more-privileged software component or the less-privileged software component.

The flowchart then transitions to block 940 in which the more-privileged software component performs tasks for the less-privileged software component including accessing management data. The flowchart then transitions to 950 where the more-privileged software component determines if there is a translation fault when accessing the management data. For example, an access attempt to management data for a different less-privileged software component can result in a translation fault. If there is a translation fault, then the access is blocked at 965. If there is not a translation fault, then the access is allowed, and the task is completed at 960. In either case, the more-privileged software component then determines if there are more tasks at block 970. If there are no more tasks, the more-privileged software component clears the enable bit, and returns the execution context to the less-privileged software component 975. If there are more tasks at 970, then the flowchart returns to 940 to repeat the process.

Figure 10:
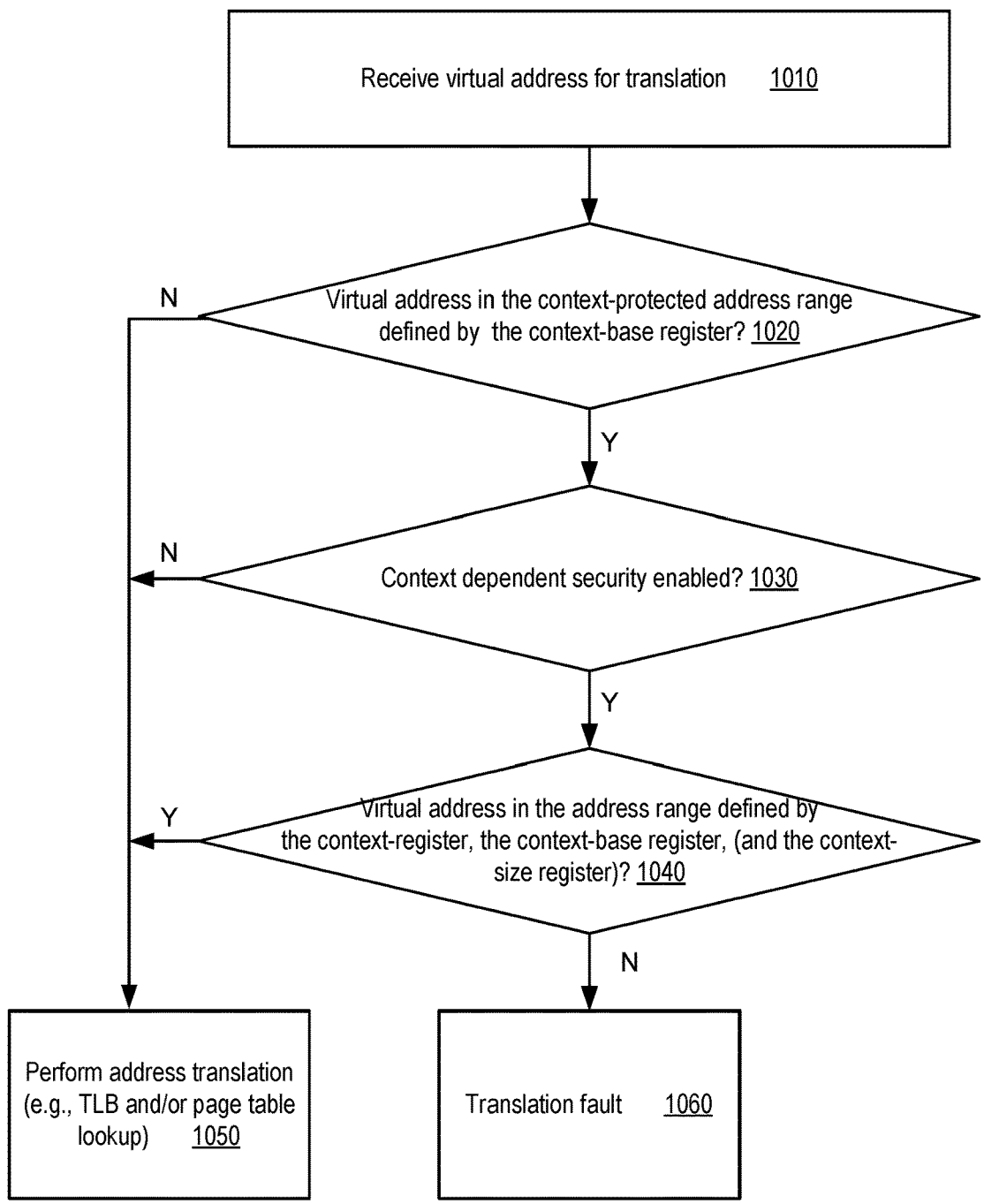
FIG. 10 is a flow diagram illustrating aspects of operations that may be performed by a hardware component (e.g., a translation mechanism such as memory-access address translation circuitry and/or a memory management unit ("MMU")) implementing hardware supported context-dependent address space hiding, according to at least some embodiments.

FIG. 10 is a flow diagram illustrating aspects of operations that may be performed by a hardware component of a processor (e.g., a translation mechanism such as a memory-access address translation circuitry and/or a memory management unit ("MMU")) implementing hardware supported context-dependent address space hiding, according to at least some embodiments. The flowchart begins at 1010, where the hardware component receives a virtual address for translation. The flowchart then transitions to block 1020 where the processor determines if the virtual address is in the context-protected address range defined by the context-base register, which is the range of the virtual address space of the more-privileged software component that is protected by this hardware supported context-dependent address space hiding mechanism. If the virtual address is not in the context-protected address range defined by the context-base register, then this means that the processor is trying to fetch virtual memory that is not covered by the hardware supported context-dependent address space hiding mechanism. Therefore, the flowchart transitions to block 1050 to perform address translation (e.g., by a translation lookaside buffer ("TLB") and/or page table lookup). If the virtual address is in the context-protected address range defined by the context-base register, then this means that the virtual address is in the range covered by the hardware supported context-dependent address space hiding mechanism, and so the flowchart therefore continues on t block 1030.

At block 1030, the hardware component of the processor determines if context dependent security is enabled. In order to determine if the context dependent security is enabled, the hardware component might use an "enable bit" that was set by the more-privileged software component, or it might use other registers or bits or memory locations, or it might use information about whether it is performing address translation for the more-privileged software component, or the less-privileged software component, depending on the embodiment. For example, if it is performing address translation for the more-privileged software component, then context dependent security would be enabled, and if it was performing address translation for the less-privileged software component, then context dependent security would not be enabled, in some embodiments. If context dependent security is not enabled, then the hardware supported context-dependent address space hiding mechanism is not in operation, and so the flowchart transitions to block 1050. If context dependent security is enabled, then the flowchart continues on to decision block 1040. It is important to note that blocks 1020 and 1030 can be switched, such that block 1030 occurs first, and a yes answer from 1030 would then transition to block 1020. There is nothing between 1020 and 1030 that requires any order between them, in some embodiments.

At block 1040, the hardware component of the processor determines if the received virtual address is in the address range defined by the context-register, the context-base register (and the context-size register, if used). If the virtual address is in such a range, then this means that the virtual address being accessed is associated with the "in-context" less-privileged software component, and so can be accessed in some embodiments. Therefore, then flowchart would transition to block 1050 in such a case. If the virtual address is not in such a range, this means that the virtual address being accessed is associated with an "out-of context" less-privileged software component, an so access should be blocked. Therefore, the flowchart transitions to block 1060 in such a case which provides a translation fault to the active process, which should be the more-privileged software component in these embodiments.

Figure 11:
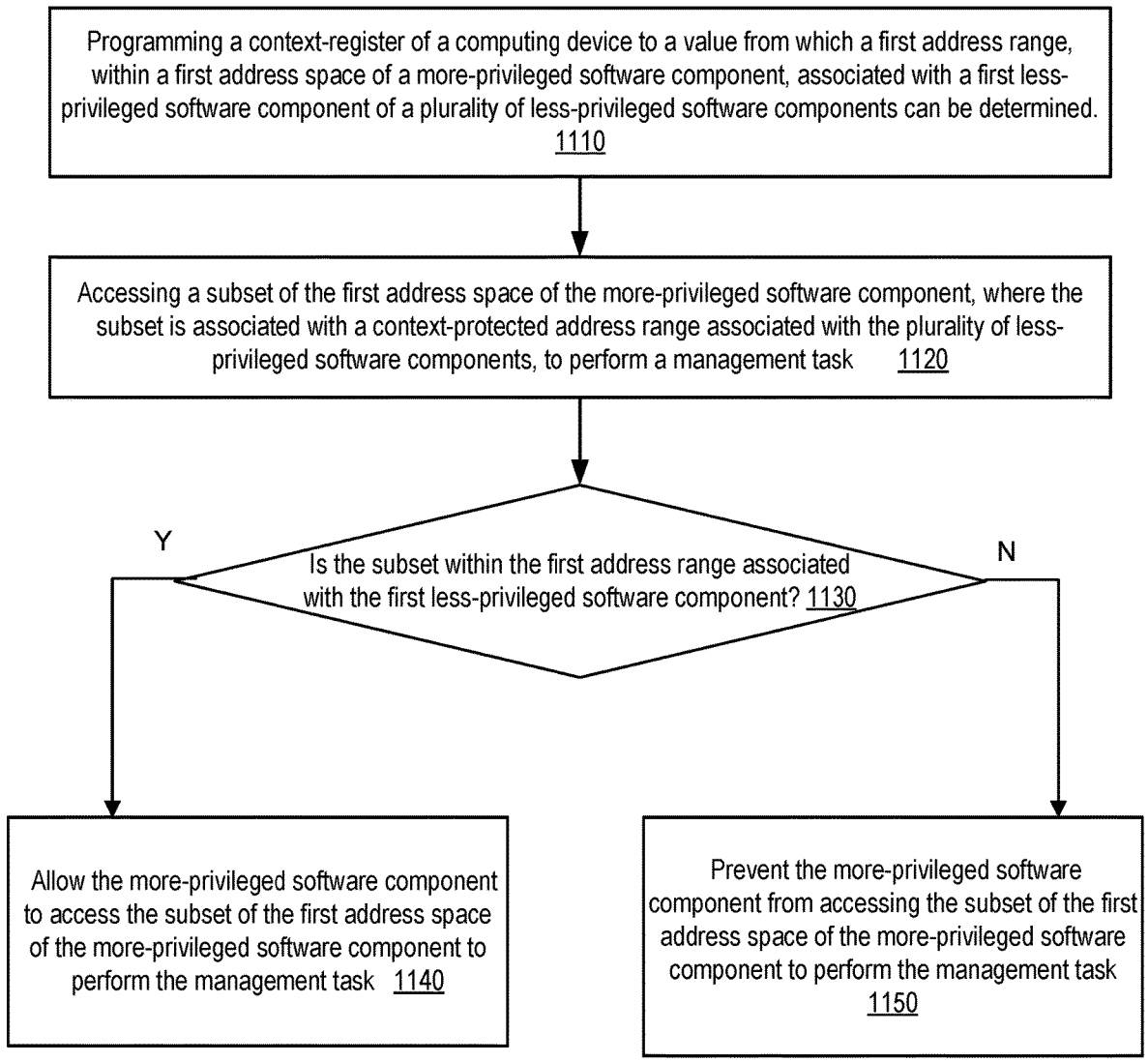
FIG. 11 is a flow diagram illustrating aspects of operations that may be performed to implement hardware supported context-dependent address space hiding, according to at least some embodiments.

FIG. 11 is a flow diagram illustrating aspects of operations that may be performed to implement hardware supported context-dependent address space hiding, according to at least some embodiments. FIG. 11 begins at block 1110 which programs a context-register of a computing device to a value from which a first address range, within a first address space of a more-privileged software component, associated with a first "in-context" less-privileged software component of a plurality of less-privileged software components can be determined. The flowchart then transitions to block 1120 where the more-privileged software component accesses a subset of the first address space of the more-privileged software component, where the subset is associated with a context-protected address range associated with the plurality of less-privileged software components, to perform a management task. The flowchart transitions to block 1130 which asks if the subset is within the first address range associated with the first "in-context" less-privileged software component. If the subset being accessed is in such a range, then the flowchart transitions to block 1140 which allows the more-privileged software component to access the subset of the first address space of the more-privileged software component to perform the management task. If the subset being accessed is not in such a range, then the flowchart transitions to block 1150 which prevents the more-privileged software component from accessing the subset of the first address space of the more-privileged software component to perform the management task.

Use Cases

The techniques described above, using hardware supported context-dependent address space hiding in processors, may be extremely useful in enhancing application security in various environments. Many servers employed as multi-tenant virtualization hosts at computing services implemented at provider network or cloud computing environments may, for example, be used concurrently to run applications on behalf of numerous clients. If such virtualization hosts comprise modem processors at which the kinds of security vulnerabilities discovered recently are present, and the vulnerabilities are not mitigated, this may expose application data to potential unauthorized capture via side channels. By using hardware support for context-dependent address space hiding, the chances of such data capture may be eliminated, with relatively low performance overhead.

Illustrative Computer System

Figure 12:
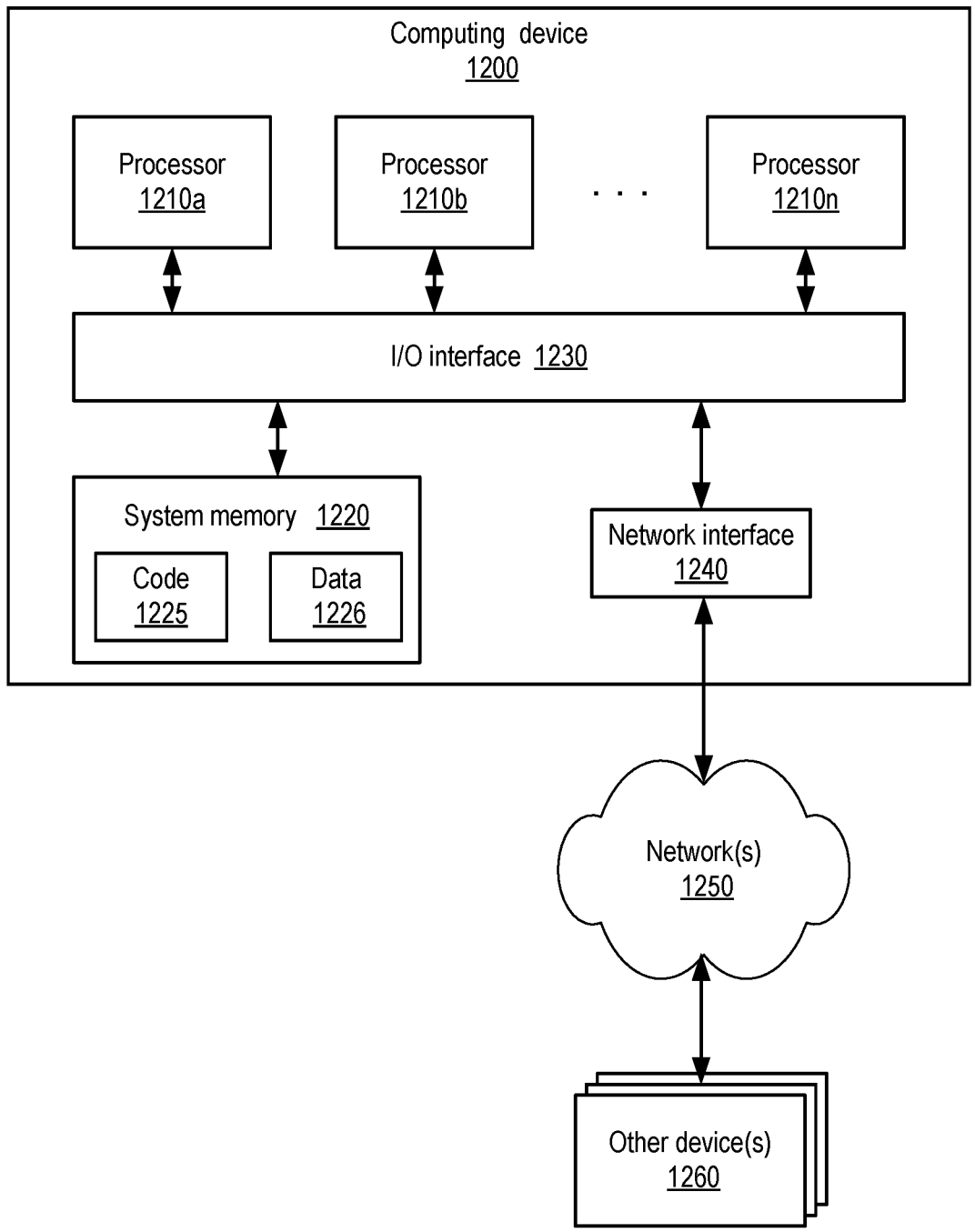
FIG. 12 is a block diagram illustrating an example computing device that may be used in at least some embodiments.

FIG. 12 is a block diagram illustrating an example computing device that may be used in at least some embodiments. In at least some embodiments, a server that implements a portion or all of one or more of the technologies described herein, including the techniques for hardware support for context-dependent address space hiding via various components of an operating system or hypervisor, may include a general-purpose computer system that includes or is configured to access one or more computer-accessible media. FIG. 12 illustrates such a general-purpose computing device 1200. In the illustrated embodiment, computing device 1200 includes one or more processors 1210 coupled to a system memory 1220 (which may comprise both non-volatile and volatile memory modules) via an input/output (I/O) interface 1230. Computing device 1200 further includes a network interface 1240 coupled to I/O interface 1230.

In various embodiments, computing device 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA. In some implementations, graphics processing units (GPUs) may be used instead of, or in addition to, conventional processors.

System memory 1220 may be configured to store instructions and data accessible by processor(s) 1210. In at least some embodiments, the system memory 1220 may comprise both volatile and non-volatile portions; in other embodiments, only volatile memory may be used. In various embodiments, the volatile portion of system memory 1220 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferro-electric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 1220 as code 1225 and data 1226.

In one embodiment, I/O interface 1230 may be configured to coordinate I/O traffic between processor 1210, system memory 1220, and any peripheral devices in the device, including network interface 1240 or other peripheral interfaces such as various types of persistent and/or volatile storage devices. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computing device 1200 and other devices 1260 attached to a network or networks 1250, such as other computer systems or devices as illustrated in FIG. 1 through FIG. 11, for example. Additionally, network interface 1240 may support communication via telecommunications/telephony networks such as analog voice networks or digital fiber communications networks, via storage area networks such as Fibre Channel SANs, or via any other suitable type of network and/or protocol.

In some embodiments, system memory 1220 may be one embodiment of a computer-accessible medium configured to store program instructions and data as described above for FIG. 1 through FIG. 11 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 1200 via I/O interface 1230. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 1200 as system memory 1220 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 1240. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   a computing device, comprising one or more processors and associated memory, wherein the one or more processors support a more-privileged software component with a virtual address space, and a plurality of less-privileged software components including a first less-privileged software component, and a second less-privileged software component, wherein the more-privileged software component has a higher memory access privilege than the plurality of less-privileged software components, wherein the higher memory access privilege provides access to one or more portions of the virtual address space;
   wherein the computing device comprises a first register storing location information for the one or more portions of the virtual address space used by the more-privileged software component to store management data for performing management tasks on behalf of the plurality of less-privileged software components; and
   wherein responsive to a call for a management task from the first less-privileged software component, the more privileged software component of the computing device is configured to:
      determine an identifier for the first less-privileged software component;
      determine to apply a context dependent memory access security mechanism;
      program a second register of the computing device according to the determined identifier for the first less-privileged software component to identify a subset of the one or more portions of the virtual address space;
      access the subset of the one or more portions of the virtual address space to perform the management task, wherein the context dependent memory access security mechanism blocks any memory access attempts to the one or more portions of the virtual address space not in the subset; and
      subsequent to completion of the management task, return an execution context to the first less-privileged software component.

2. The system as recited in claim 1, wherein the more-privileged software component is an operating system, and the plurality of less-privileged software components are applications running under the operating system.

3. The system as recited in claim 1, the more-privileged software component is a hypervisor, and the plurality of less-privileged software components are virtual machines running under the hypervisor.

4. The system as recited in claim 1, wherein the computing device further comprises a third register,
  wherein a third register stores a fixed size of subsets of the one or more portions of the virtual address space, including the subset, used by the more-privileged software component to store the management data for performing the management tasks on behalf of individual less-privileged software components of the plurality of less-privileged software components, including the first and second less-privileged software components;
  wherein the more privileged software component of the computing device is further configured to:
    determine an address location of the subset of the one or more portions of the virtual address space used by the more-privileged software component to store management data for performing management tasks on behalf of the first less-privileged software component by multiplying the third register with the second register and adding a result of the multiplication to the first register.

5. The system as recited in claim 1, wherein to block any memory access attempts to the one or more portions of the virtual address space not in the subset, responsive to the more-privileged software component accessing the one or more portions of the virtual address space to perform the management task, the context dependent memory access mechanism is configured to:
  obtain the location information for the one or more portions of the virtual address space used by the more-privileged software component to store management data for performing management tasks from the first register;
  determine a first address range for the one or more portions of the virtual address space;
  determine that the memory access attempts is for memory within the first address range;
  determine an address location of the subset of the one or more portions of the virtual address space used by the more-privileged software component to store management data for performing management tasks on behalf of the first less-privileged software component;
  obtain a size of the subset of the one or more portions of the virtual address space corresponding to a single less-privileged software component of the plurality of less-privileged software components reside;
  determine a second address range of the subset of the one or more portions of the virtual address space used by the more-privileged software component to store management data for performing management tasks on behalf of the first less-privileged software component, based at least in part on the address location of the subset and the size of the subset;
  determine that the memory access attempts are for memory not within the second address range; and
  provide the translation fault to the more-privileged software component based at least in part on the determination that the memory access attempts are for memory not within the second address range.

6. A method, comprising:
  programming a first register to store location information for one or more portions of a virtual address space used by a more-privileged software component to store management data for performing management tasks on behalf of a plurality of less-privileged software components, wherein the more-privileged software component has a higher memory access privilege than the plurality of less-privileged software components that provides access to the one or more portions of the virtual address space;
  responsive to a call for a management task from a first less-privileged software component of the plurality of less-privileged software components, the more privileged software component performing:
    determining, an identifier for the less-privileged software component;
    determining to apply a context dependent memory access security mechanism;
    programming a second register according to the determined identifier for the first less-privileged software component to identify a subset of the one or more portions of the virtual address space;
    accessing the subset of the one or more portions of the virtual address space to perform the management task, wherein the context dependent memory access security mechanism blocks any memory access attempts to the one or more portions of a virtual address space not in the subset;
    subsequent to completion of the management task, returning an execution context to the less-privileged software component.

7. The method of claim 6, wherein the computing device further comprises a third register,
  wherein a third register stores a fixed size of subsets of the one or more portions of the virtual address space, including the subset, used by the more-privileged software component to store the management data for performing the management tasks on behalf of individual less-privileged software components of the plurality of less-privileged software components, including the first less-privileged software component;
  wherein the more privileged software component further performs:
    determining an address location, of the subset of the one or more portions of the virtual address space used by the more-privileged software component to store management data for performing management tasks on behalf of the first less-privileged software component, by multiplying the third register with the second register and adding a result of the multiplication to the first register.

8. The method of claim 6, wherein to block a memory access attempt of the any memory access attempts to the one or more portions of the virtual address space not in the subset, responsive to the more-privileged software component accessing the one or more portions of the virtual address space to perform the management task, the context dependent memory access mechanism further performs:
  obtaining the location information, for the one or more portions of the virtual address space used by the more-privileged software component to store management data for performing management tasks, from the first register;
  determining a first address range for the one or more portions of the virtual address space;
  determining that the memory access attempt is for memory within the first address range;
  determining an address location of the subset of the one or more portions of the virtual address space used by the more-privileged software component to store management data for performing management tasks on behalf of the first less-privileged software component;

obtaining a size of the subset of the one or more portions of the virtual address space corresponding to a single less-privileged software component of the plurality of less-privileged software components reside;

determining a second address range of the subset of the one or more portions of the virtual address space used by the more-privileged software component to store management data for performing management tasks on behalf of the first less-privileged software component, based at least in part on the address location of the subset and the size of the subset;

determining that the memory access attempt is for memory not within the second address range; and providing the translation fault to the more-privileged software component based at least in part on the determination that the memory access attempt is for memory not within the second address range.

9. The method of claim 6, wherein the more-privileged software component comprises an operating system, and the plurality of less-privileged software components comprise applications running under the operating system.

10. The method of claim 6, the more-privileged software component comprises a hypervisor, and the plurality of less-privileged software components comprise virtual machines running under the hypervisor.

11. The method of claim 6, to block a memory access attempt of the any memory access attempts to the one or more portions of the virtual address space not in the subset, the context dependent memory access mechanism further performs:

providing, by address translation circuitry and based at least in part on the first and second register, a translation fault to the more-privileged software component, responsive to the more-privileged software component accessing the one or more portions of the virtual address space to perform the management task.

12. The method of claim 6, wherein the second register comprises an enable bit to enable the context dependent memory access security mechanism, and wherein determining to apply the context dependent memory access security mechanism, the more privileged software component further performs:

programming the enable bit of the second register to enable the context dependent memory access security mechanism.

13. The method of claim 6, wherein the context dependent memory access security mechanism allows memory access attempts to the subset of the one or more portions of the virtual address space, wherein the subset is used by the more-privileged software component to store management data for performing management tasks on behalf of the first less-privileged software component.

14. The method of claim 6, wherein the context dependent memory access security mechanism allows memory access attempts to the virtual address space that are not within the one or more portions of the virtual address space used by the more-privileged software component to store management data for performing management tasks on behalf of the plurality of less-privileged software components.

15. The method of claim 6, wherein the call for the management task from the first less-privileged software component comprises an interrupt, indicating that the more-privileged software component is to be scheduled, generated during execution of an instruction stream of the first less-privileged software component.

16. A processor, comprising:

one or more hardware execution units configured to execute program instructions for a plurality of software components including a more-privileged software component and a plurality of less-privileged software components, wherein the more-privileged software component has a higher memory access privilege than the plurality of less-privileged software components, and is configured to perform management tasks on behalf of the less-privileged software components using management data at one or more portions of a virtual address space to which the more-privileged software component has access according to the higher memory access privilege;

a first hardware register for storing location information for the one or more portions of the virtual address space used by the more-privileged software component;

a second hardware register for storing an identifier for one of the privileged software components for which the more-privileged software component is to perform a management task, wherein the identifier maps to a subset of the one or more portions of the virtual address space;

address translation circuitry configured to translate, for memory access instructions executed by the one or more hardware execution units, addresses in the virtual address space to addresses in a physical address space for accessing the physical memory, wherein to translate an address in the virtual address space for a memory access, the address translation circuitry is configured to:

determine whether to apply context dependent memory access security;

responsive to a determination to apply context dependent memory access security, determine, based on contents of the first and second hardware registers, whether the address in the virtual address space is within the subset of the one or more portions of the virtual address space;

responsive to a determination the address in the virtual address space is within the subset of the one or more portions of the virtual address space, allow translation of the address in the virtual address space to an address in the physical address space; and responsive to a determination the address in the virtual address space is not within the subset of the one or more portions of the virtual address space, block the memory access.

17. The processor of claim 16, wherein to translate the address in the virtual address space for the memory access, the address translation circuitry is further configured to:

responsive to a determination to not apply context dependent memory access security, allow translation of the address in the virtual address space to an address in the physical address space.

18. The processor of claim 16, wherein to translate the address in the virtual address space for the memory access, the address translation circuitry is further configured to:

determine, based on contents of the first hardware register, whether the address in the virtual address space is within the one or more portions of the virtual address space used by the more-privileged software component;

responsive to a determination that the address in the virtual address space is not within the one or more portions of the virtual address space, allow translation of the address in the virtual address space to an address in the physical address space; and wherein to determine, based on the contents of the first and second hardware registers, whether the address in the virtual address space is within the subset of the one or more portions of the virtual address space, is responsive to the determination to apply context dependent memory access security, and responsive to a determination that the address in the virtual address space is within the one or more portions of the virtual address space.

19. The processor of claim 16, wherein to translate the address in the virtual address space for the memory access, the address translation circuitry is further configured to:

determine, based on contents of the first hardware register, whether the address in the virtual address space is within the one or more portions of the virtual address space used by the more-privileged software component;

responsive to a determination that the address in the virtual address space is not within the one or more portions of the virtual address space, allow translation of the address in the virtual address space to an address in the physical address space; and wherein to determine whether to apply the context dependent memory access security is responsive to a determination that the address in the virtual address space is within the one or more portions of the virtual address space.

20. The processor of claim 16, further comprising a third hardware register for storing a fixed size of subsets of the one or more portions of the virtual address space, including the subset, used by the more-privileged software component to store the management data for performing the management tasks on behalf of individual less-privileged software components of the plurality of less-privileged software components;

wherein to determine, based on contents of the first and second hardware registers, whether the address in the virtual address space is within the subset of the one or more portions of the virtual address space, the address translation circuitry is further configured to:

determine a beginning virtual address, of the subset of the one or more portions of the virtual address space, by multiplying the third register with the second register and adding a result of the multiplication to the first register;

determine an ending virtual address by adding the second register to the beginning virtual address; and determine whether the address in the virtual address space is between the beginning virtual address and the ending virtual address.

\* \* \* \* \*